(12) United States Patent
Liu

(10) Patent No.: US 12,636,981 B2
(45) Date of Patent: May 26, 2026

(54) CHILD SAFETY SEAT

(71) Applicant: Wonderland Switzerland AG, Steinhausen (CH)

(72) Inventor: Zujian Liu, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 160 days.

(21) Appl. No.: 18/725,293

(22) PCT Filed: Dec. 29, 2022

(86) PCT No.: PCT/EP2022/088013
§ 371 (c)(1),
(2) Date: Jun. 28, 2024

(87) PCT Pub. No.: WO2023/126482
PCT Pub. Date: Jul. 6, 2023

(65) Prior Publication Data
US 2025/0108735 A1     Apr. 3, 2025

(30) Foreign Application Priority Data

Dec. 29, 2021   (CN) .......................... 202111639481.7
Dec. 29, 2021   (CN) .......................... 202111642321.8

(51) Int. Cl.
*B60N 2/28*         (2006.01)
*B60N 2/26*         (2006.01)

(52) U.S. Cl.
CPC ........... *B60N 2/2809* (2013.01); *B60N 2/274* (2023.08); *B60N 2/2851* (2013.01)

(58) Field of Classification Search
CPC ..... B60N 2/2809; B60N 2/2851; B60N 2/274
See application file for complete search history.

(56) References Cited

U.S. PATENT DOCUMENTS

| 11,884,227 B2 | 1/2024 | Guo |
| 2012/0146369 A1 | 6/2012 | Gaudreau, Jr. |

(Continued)

FOREIGN PATENT DOCUMENTS

| CN | 106043018 A | 10/2016 |
| CN | 107745660 A | 3/2018 |

(Continued)

OTHER PUBLICATIONS

Office Action issued in corresponding Taiwanese Application No. 111150551 dated Aug. 10, 2023.

(Continued)

*Primary Examiner* — Eric J Kurilla
(74) *Attorney, Agent, or Firm* — Volpe Koenig

(57) ABSTRACT

A child safety seat, including: a seat housing; a headrest arranged on the seat housing in a height-adjustable manner; a top tether extending from the top of the seat housing for connection with an anchor point of a vehicle; a safety belt attached to the seat housing; and a locking apparatus arranged on the seat housing. The locking apparatus includes a locking member and an elastic member. The locking member is switchable between a lock position for locking one of the headrest and the safety belt and an unlock position for unlocking the one of the headrest and the safety belt, and the elastic member acts on the locking member to keep the locking member at the lock position. The top tether is configured to act on the locking member when tensioned, so that the locking member overcomes force of the elastic member to switch from the lock position to the unlock position.

20 Claims, 16 Drawing Sheets

(56) References Cited

U.S. PATENT DOCUMENTS

2018/0015847 A1 *   1/2018   Renaudin ............. B60N 2/2872
2022/0111774 A1 *   4/2022   Stewart ............... B60N 2/2812

FOREIGN PATENT DOCUMENTS

| EP | 2687401 A2 * | 1/2014 | ............. B60R 22/18 |
| FR | 2978709 A1 * | 2/2013 | ........... B60N 2/2809 |
| JP | 2021-041917 A | 3/2021 | |
| WO | 2016115366 A2 | 7/2016 | |
| WO | 2016115366 A3 | 7/2016 | |

OTHER PUBLICATIONS

International Search Report and Written Opinion for PCT//EP2022/088013 dated Mar. 24, 2023.

Japan Patent Office. Office Action issued in corresponding application JP 2024-539739, issued Oct. 7, 2025. 9 pages.

* cited by examiner

CHILD SAFETY SEAT

CROSS-REFERENCE TO RELATED APPLICATIONS

This application is a National Stage application of PCT/EP2022/088013, filed on Dec. 29, 2022, which claims the benefit of Chinese Application No. 202111639481.7, filed on Dec. 29, 2021 and Chinese Application No. 202111642321.8, filed on Dec. 29, 2021, all of which are incorporated herein by reference in their entirety.

TECHNICAL FIELD

The present application relates to the field of children's products, and in particular, to a child safety seat.

BACKGROUND

A child safety seat is fixed to a seat in a vehicle when in use, and a child is tied therein by a safety belt that the child safety seat is provided with, so as to provide safety protection for the child traveling by car. Some child safety seats are fixed to vehicle seats by using safety belts of the vehicle seats, while some child safety seats are fixed to the vehicle seats through ISOFIX plugs and top tethers. When a child safety seat provided with a top tether is fixed to a vehicle seat, an end portion of the top tether provided with a hook extends from the top of a backrest portion of the child safety seat, and the hook can be engaged with any anchor point located anywhere inside the vehicle. After the hook of the top tether is engaged with the anchor point, the top tether is adjusted to a tensioned state, which can effectively prevent forward movement of the backrest portion of the child safety seat in case of an accident, thereby preventing injuries to the head of the child in the child safety seat. However, when the child safety seat is in use, it often happens that the top tether is not tensioned or even not engaged with the anchor point of the vehicle, which directly leads to an unreliable fixing of the child safety seat.

SUMMARY

The present application is intended to provide a child safety seat, so as to effectively prevent a top tether from being not properly mounted when the child safety seat is in use.

A child safety seat provided by embodiments of the present application includes: a seat housing; a headrest arranged on the seat housing in a height-adjustable manner; a top tether extending from a top of the seat housing for connection with an anchor point of a vehicle; a safety belt attached to the seat housing; and a locking apparatus arranged on the seat housing and including a locking member and an elastic member. The locking member is switchable between a lock position for locking one of the headrest and the safety belt and an unlock position for unlocking the one of the headrest and the safety belt, and the elastic member acts on the locking member to keep the locking member at the lock position; and the top tether is configured to act on the locking member when tensioned, so that the locking member overcomes a force of the elastic member to switch from the lock position to the unlock position.

In an embodiment, the child safety seat includes a backrest portion, the headrest is arranged on the backrest portion in a height-adjustable manner, and the top tether extends from the top of the backrest portion. The locking apparatus is a first locking apparatus mounted on the backrest portion and including a first locking member and a first elastic member, the first locking member is switchable between a lock position for locking the headrest and an unlock position for unlocking the headrest, the first elastic member acts on the first locking member to keep the first locking member at the lock position; and the top tether is operably connected to the first locking member, and the top tether drives the first locking member to move when tensioned, so that the first locking member overcomes force of the first elastic member to switch from the lock position to the unlock position.

In an embodiment, the headrest is provided with a plurality of locking holes in a height direction of the headrest; the backrest portion is provided with a first through hole, and the first locking member is in sliding fit with the first through hole; and when the first locking member is at the lock position, the first locking member is inserted into the corresponding locking hole to restrict a height adjustment of the headrest; and when the first locking member is at the unlock position, the first locking member exits the corresponding locking hole to allow the height adjustment of the headrest.

In an embodiment, the backrest portion is provided with a first through hole, and the first locking member is in sliding fit with the first through hole; and the first elastic member is a spring located in the first through hole and sleeving the first locking member.

In an embodiment, a first end of the top tether is connected to the first locking member through a connector, and a second end of the top tether extends from the top of the backrest portion.

In an embodiment, the backrest portion is provided with a first through hole, and the first locking member is in sliding fit with the first through hole; and the connector includes a flexible belt or a flexible chain, and an end of the first through hole is provided with an arc-shaped structure for contact with the connector.

In an embodiment, a first end of the top tether is connected with a slider, and a second end of the top tether extends from the top of the backrest portion; the slider is in sliding fit with the backrest portion in a manner of being capable of moving upwards and downwards, and a predetermined angle is formed between a movement direction of the slider and a movement direction of the first locking member; and the first locking apparatus further includes a motion steering mechanism connected between the slider and the first locking member and configured to convert an upward movement of the slider into a movement of the first locking member from the lock position to the unlock position.

In an embodiment, a sliding limit structure is arranged between the backrest portion and the slider.

In an embodiment, the sliding limit structure includes: a first elongated hole arranged in the slider; and a pin mounted on the backrest portion and in sliding fit with the first elongated hole.

In an embodiment, the child safety seat further includes: a second elastic member connected between the backrest portion and the slider, and when the top tether is tensioned, the second elastic member applies a downward force to the slider.

In an embodiment, the slider is provided with a second elongated hole for the first locking member to pass through; and the motion steering mechanism includes: a lifting portion connected to the slider and provided with a lifting slope extending away from the backrest portion; and a driving pin connected to the first locking member and abutting against the lifting slope.

In an embodiment, an axial direction of the driving pin is perpendicular to that of the first locking member, and the driving pin is attached to or integrally formed with the first locking member.

In an embodiment, at least part of the hole wall of the first through hole is surrounded by a boss protruding outwards from the backrest portion.

In an embodiment, the lifting portion is formed by a U-shaped rib, and the lifting slopes are formed on two opposite wall bodies of the U-shaped rib; and the first locking member is located between the two opposite wall bodies, and two ends of the driving pin abut against the lifting slopes of the two opposite wall bodies, respectively.

In an embodiment, the U-shaped rib is arranged on a mounting plate, the mounting plate is fixedly connected to the slider; and the U-shaped rib passes through the second elongated hole, and the mounting plate is provided with a third elongated hole for the first locking member to pass through.

In an embodiment, at least part of the hole wall of the first through hole is surrounded by a boss protruding outwards from the backrest portion, wherein the boss is in sliding fit with the two opposite wall bodies; and the boss is provided with a guide groove for the driving pin to pass through.

In an embodiment, the headrest has a plurality of positioning heights; the child safety seat further includes a second locking apparatus, the second locking apparatus is arranged between the headrest and the backrest portion and configured to lock the headrest to any of the positioning heights; and when the headrest is at any of the positioning heights, a loosed top tether allows the first locking member to lock the headrest.

In the child safety seat according to the above embodiments of the present application, when in use, if the top tether is not engaged with the anchor point of the vehicle or the top tether is engaged with the anchor point of the vehicle but is not tensioned, the first locking member of the first locking apparatus may lock the headrest under the action of the first elastic member, causing the positioning height of the headrest to be unadjustable, which may prompt a parent to check whether the top tether is engaged with the anchor point of the vehicle and whether the top tether is tensioned. After the top tether is properly mounted, the tensioned top tether may drive the first locking member to unlock the headrest. In this case, the parent can adjust the height of the headrest according to an actual requirement. In the present application, by associating the tension of the top tether with the height adjustment of the headrest, the parent can easily find and solve the problem that the top tether is not properly mounted when adjusting the position of the headrest, thereby improving use reliability of the child safety seat.

In an embodiment, the locking apparatus is a third locking apparatus including a third locking member and a third elastic member, the third locking member is switchable between a lock position for locking the safety belt and an unlock position for unlocking the safety belt, the third elastic member acts on the third locking member to keep the third locking member at the lock position, and the top tether is configured to act on the third locking member when tensioned, so that the third locking member overcomes a force of the third elastic member to switch from the lock position to the unlock position.

In an embodiment, the third locking member is provided with a first pivot shaft, and the third locking member is switchable between the lock position and the unlock position by rotating around the first pivot shaft.

In an embodiment, the safety belt includes a shoulder belt and an adjustment belt, which are connected with each other, the adjustment belt enables the shoulder belt to tighten a child when pulled outwards; and the third locking member is provided with a pressing portion and an abutting portion, the pressing portion is adapted to be driven by the top tether to rotate around the first pivot shaft, the abutting portion locks the safety belt by abutting against the adjustment bel.

In an embodiment, the abutting portion is provided with a toothed portion adapted to engage with the adjustment belt.

In an embodiment, the toothed portion includes a ratchet tooth.

In an embodiment, a first end of the top tether is connected to a fixed point, and a second end of the top tether is configured to be connected to the anchor point of the vehicle; and the third locking member is arranged close to the first end of the top tether, and the top tether, when tensioned, presses against the pressing portion to cause the third locking member to rotate from the lock position to the unlock position.

In an embodiment, the third locking apparatus further includes a connecting rod arranged parallel to the first pivot shaft, the connecting rod forms the fixed point, and the first end of the top tether is provided with a first ring sleeving the connecting rod.

In an embodiment, a first end of the top tether is connected to the pressing portion, and a second end of the top tether is configured to be connected to the anchor point of the vehicle.

In an embodiment, the pressing portion is provided with a second mounting hole, and the first end of the top tether is provided with a second ring passing through the second mounting hole.

In an embodiment, the first locking member further includes a bracket, the bracket includes a bottom plate, and a first side plate and a second side plate which are opposite to each other, two ends of the first pivot shaft are connected to the first side plate and the second side plate, respectively, and the third elastic member is a torsion spring sleeving the first pivot shaft, and when the third locking member is located at the lock position, the adjustment belt is clamped between the abutting portion and the bottom plate.

In an embodiment, the safety belt includes a shoulder belt and an adjustment belt, which are connected with each other, the adjustment belt enables the shoulder belt to tighten a child when pulled outwards; the seat housing includes a seat portion and a backrest portion, the adjustment belt extends from a front end of the seat portion, and the top tether extends from an upper part of the backrest portion; the front end of the seat portion is further provided with a fourth locking apparatus including a fourth locking member, the fourth locking member is switchable between a lock position for locking the adjustment belt and an unlock position for unlocking the adjustment belt; and the third locking apparatus is located behind the fourth locking apparatus, and the third locking member of the third locking apparatus is configured to lock or unlock the adjustment belt.

In the child safety seat according to the above embodiments of the present application, when in use, if the top tether is engaged with the anchor point of the vehicle and is tensioned, the first locking member of the first locking apparatus may unlock the safety belt, and the parent may adjust the safety belt as required. However, if the top tether is not tensioned, the safety belt may be locked by the first locking member of the first locking apparatus, causing the safety belt to be unadjustable, which may prompt the parent to check whether the top tether is engaged with the anchor point of the vehicle and whether the top tether is tensioned, so as to effectively prevent the problem that the top tether is not properly mounted when the child safety seat is in use, thereby improving use reliability of the child safety seat.

DETAILED DESCRIPTION OF THE EMBODIMENTS

Figure 1:
FIG. 1 schematically illustrates a perspective view of a child safety seat according to a first embodiment and a second embodiment of the present application, in which a headrest is at a positioning height.

FIG. 1 to FIG. 6 illustrates a child safety seat 100 according to a first embodiment of the present application, which may include a seat housing 1, a headrest 2, a top tether 3, a safety belt (not shown in figures), and a locking apparatus. In this embodiment, the locking apparatus is a first locking apparatus 4.

Figure 2:
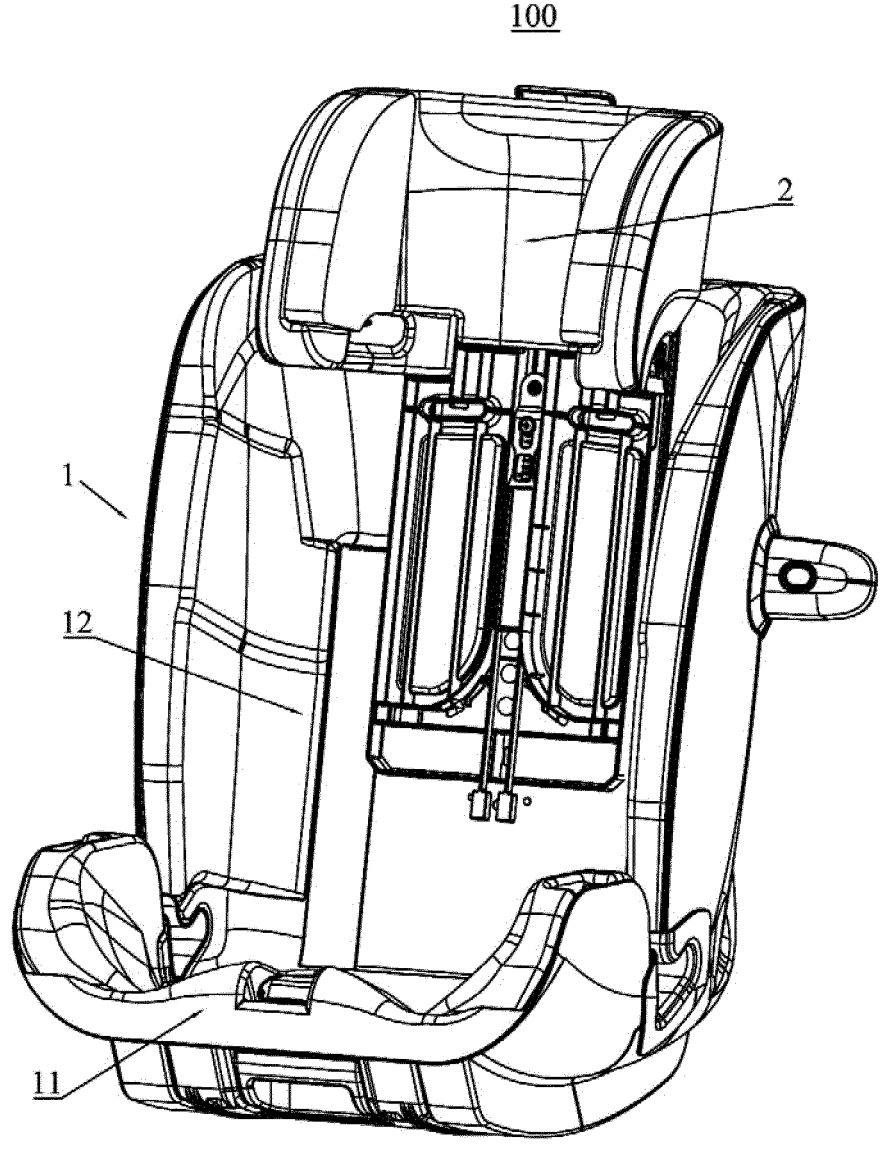
FIG. 2 schematically illustrates a perspective view of the child safety seat according to the first embodiment and the second embodiment of the present application, in which the headrest is at another positioning height.

Referring to FIG. 1 and FIG. 2, the seat housing 1 is configured in a shape of a seat for accommodating a child, and may be selectively mounted on a vehicle seat (not shown in figures) in a forward or backward manner, for example. Alternatively, in other embodiments, the seat housing 1 may be mounted on the vehicle seat only in the forward manner. The seat housing 1 includes a seat portion 11 and a backrest portion 12. Two sides of the seat portion 11 may be provided with armrests. In some embodiments, the seat housing 1 may be provided with a seat cushion and/or a back cushion to provide comfort and/or extra security for the child seated therein.

Figure 3:
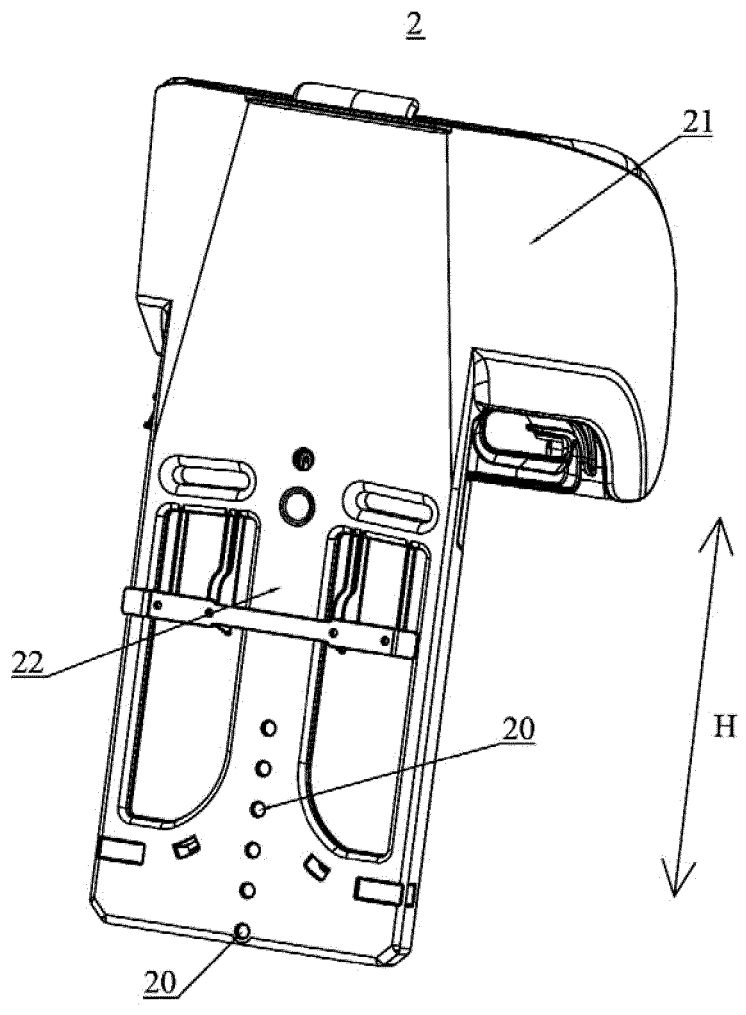
FIG. 3 schematically illustrates a perspective view of the headrest in the child safety seat according to the first embodiment and the second embodiment of the present application.

Referring to FIG. 1 and FIG. 2, the headrest 2 is arranged on the backrest portion 12 in a height-adjustable manner, so as to adapt to a sitting height of the child in the seat housing 1. Referring to FIG. 3, the headrest 2 may include, for example, a pillow portion 21 and a hanging board portion 22. The pillow portion 21 may be provided with, for example, an elastic material having a buffering and energy-absorbing effect, and the hanging board portion 22 is in sliding fit with the backrest portion 12. In combination with known arts, the height of the headrest 2 may be controlled by a height adjustment apparatus (not shown in figures) arranged between the headrest 2 and the backrest portion 12, and the height adjustment apparatus provides the headrest 2 with a plurality of positioning heights. The height adjustment apparatus may include, for example, a second locking apparatus (not shown in figures) arranged between the backrest portion 12 and the hanging board portion 22 of the headrest 2. When the second locking apparatus is in an unlocked state, the headrest 2 may move up or move down in the height direction H along the backrest portion 12. When the headrest 2 is moved to a suitable positioning height, the second locking apparatus switches to a locked state, and the headrest 2 can be positioned at the positioning height. Generally, the second locking apparatus includes a lock pin and a plurality of positioning holes respectively arranged on the headrest 2 and the backrest portion 12. The plurality of positioning holes is spaced apart in the height direction H. Through the coordination between the lock pin and different positioning holes, the headrest 2 can be fixed at different positioning heights. The plurality of positioning heights of the headrest 2 is also commonly referred to as a plurality of height adjustment gears of the headrest 2.

Figure 4:
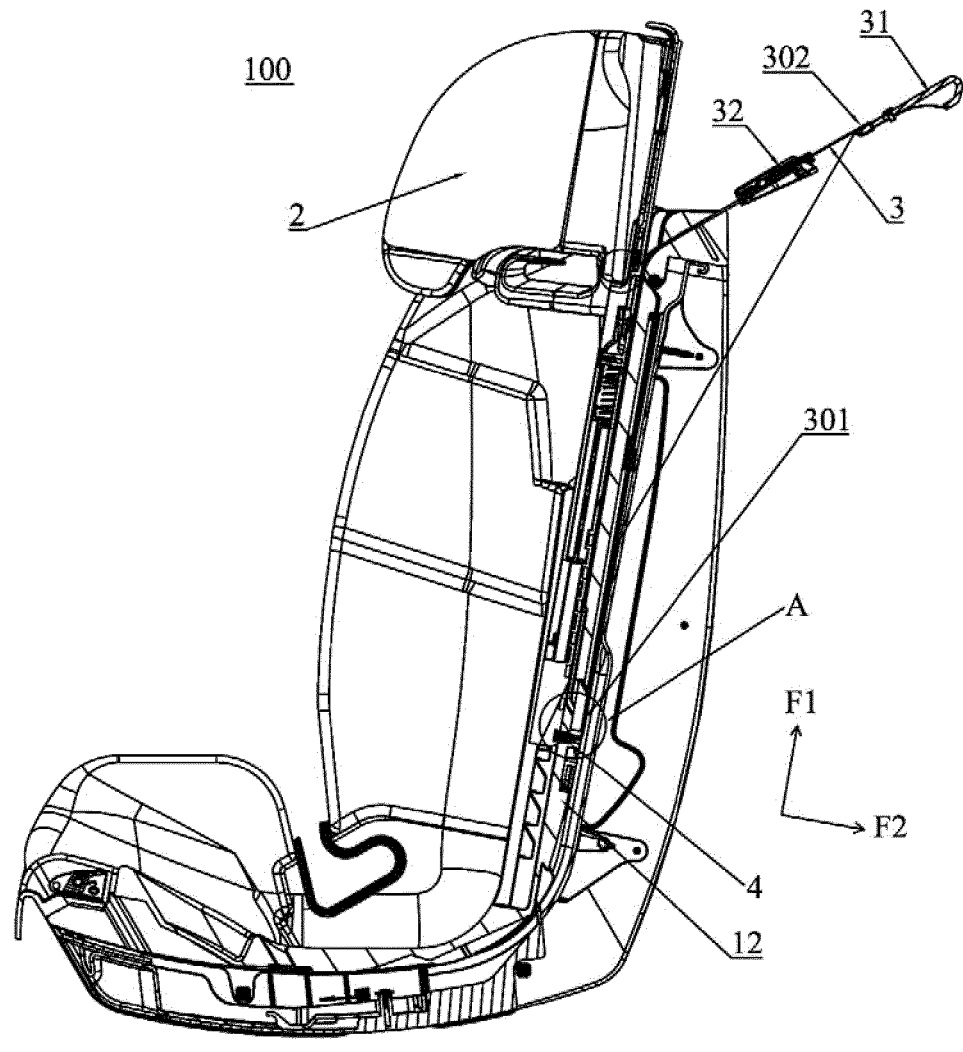
FIG. 4 schematically illustrates a sectional view of the child safety seat according to the first embodiment of the present application.

Referring to FIG. 1 and FIG. 4, a first end 301 of the top tether 3 extends into the backrest portion 12, and a second end 302 of the top tether 3 may extend from the top of the backrest portion 12 and may be provided with a hook 31. The hook 31 is configured for direct or indirect engagement with an anchor point in a vehicle. A length of the top tether 3 may be adjusted through, for example, an adjustment buckle 32. After the top tether 3 is engaged with the anchor point in the vehicle, the top tether 3 can be easily tensioned through the adjustment buckle 32, so that the top tether 3 plays a role of fixing the seat housing 1.

Figure 5:
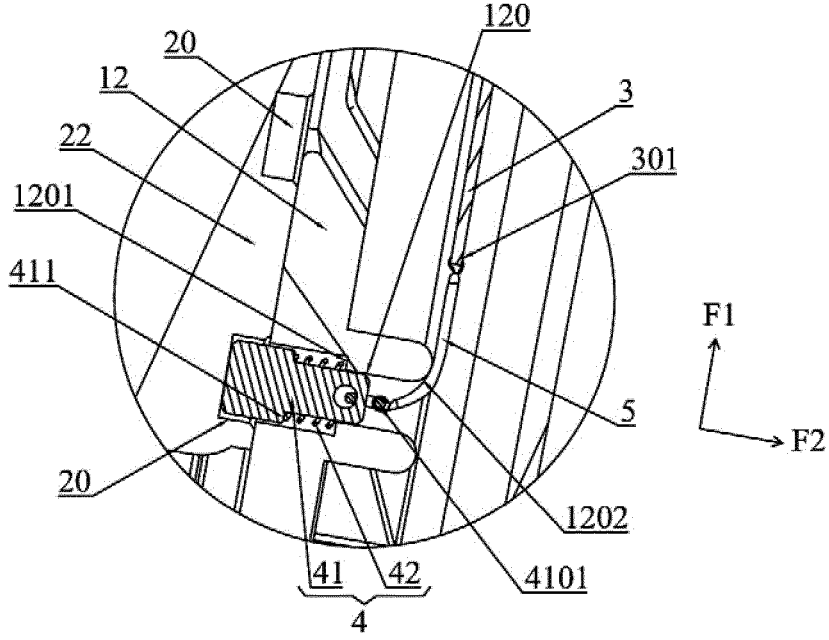
FIG. 5 is an enlarged view of an area marked by A in FIG. 4, in which a first locking member is at a lock position.
Figure 6:
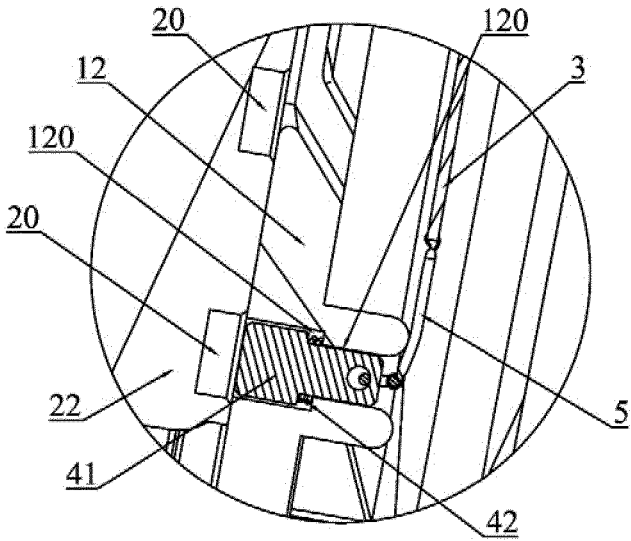
FIG. 6 is an enlarged view of the area marked by A in FIG. 4, in which the first locking member is at an unlock position.
Figure 7:
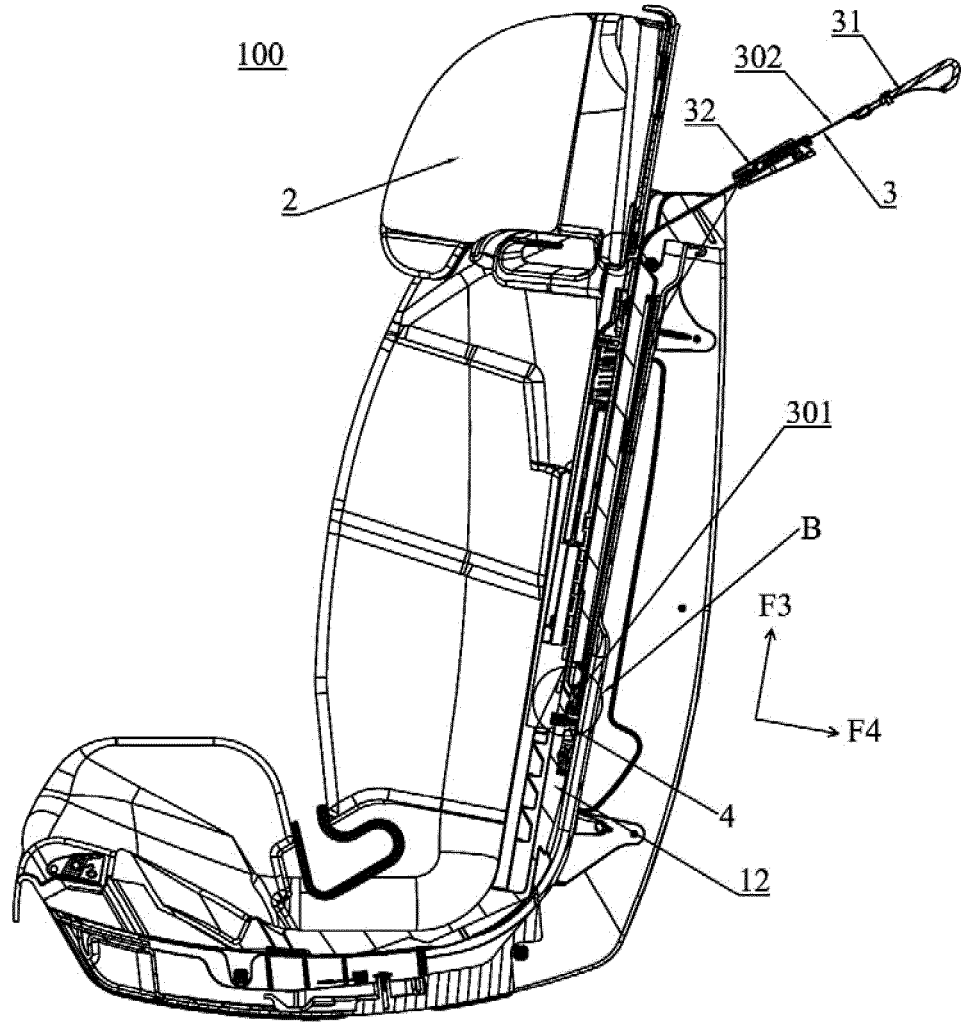
FIG. 7 schematically illustrates a sectional view of the child safety seat according to the second embodiment of the present application.

Referring to FIG. 4 to FIG. 6, the first locking apparatus 4 is mounted on the backrest portion 12 and includes a first locking member 41 and a first elastic member 42. The first locking member 41 can be switched between a lock position for locking the headrest 2 and an unlock position for unlocking the headrest 2. When the first locking member 41 is at the lock position, the height of the headrest 2 is not allowed to be adjusted. When the first locking member 41 is at the unlock position, the height of the headrest 2 is allowed to be adjusted. The first elastic member 42 acts on the first locking member 41 to keep the first locking member 41 at the lock position. The top tether 3 is operably connected to the first locking member 41, so that the top tether 3, when moving, may cause the first locking member 41 to move. More specifically, when the top tether 3 is tensioned by pulling the top tether 3 upwards, the top tether 3 may drive the first locking member 41 to move, so that the first locking member 41 overcomes the force of the first elastic member 42 to switch from the lock position to the unlock position, thereby allowing the height of the headrest 2 to be adjusted. It may be understood that, when the tensioned state of the top tether 3 is released, the first locking member 41 may automatically switch from the unlock position to the lock position under the action of the first elastic member 42, and the loose top tether 3 may be pulled downwards by the first locking member 41.

It can be seen from the above that the first locking apparatus 4 may be an additional locking apparatus capable of locking or unlocking the headrest 2, on the basis of the height adjustment apparatus for adjusting the height of the headrest 2. A position of the first locking member 41 of the first locking apparatus 4 is related to whether the top tether 3 is tensioned. In other words, even if the second locking apparatus of the height adjustment apparatus is in the unlocked state, when the top tether 3 is not tensioned so that the first locking member 41 is at the lock position for locking the headrest 2, the height of the headrest 2 is still not allowed to be adjusted. It may be understood that, after the top tether 3 is tensioned, the first locking member 41 unlocks the headrest 2 and no longer hinders the movement of the headrest 2. In this case, the positioning height of the headrest 2 may be adjusted by unlocking the second locking apparatus or the headrest 2 may be locked by the second locking apparatus at any positioning height.

In the prior art, when the child safety seat is in use, due to the complexity of the operation for securing the child safety seat in the vehicle seat and tying the child in the child safety seat, an inexperienced parent sometimes may forget to tension the top tether or even forget to engage the top tether with the anchor point. In this case, the top tether not properly mounted cannot secure the child safety seat. As a result, the child safety seat cannot reliably protect the child.

During the use of the child safety seat 100 according to the embodiments of the present application, when the child is seated in the child safety seat 100, the parent is generally required to adjust the height of the headrest 2 to a suitable positioning height. If the top tether 3 is not connected to the anchor point of the vehicle or not tensioned, the first locking member 41 keeps locking the headrest 2. In this case, even if the second locking apparatus is at the unlock position, the parent may find that the positioning height of the headrest 2 cannot be adjusted, which may prompt the parent to find out why the height of the headrest 2 cannot be adjusted. For example, by reading an instruction manual, or through a labeling reminder on the child safety seat 100, the parent can easily know that the adjustment of the positioning height of the headrest 2 is related to whether the top tether 3 is tensioned, so as to check mounting and tensioning conditions of the top tether 3, which can effectively prevent potential safety hazards caused by the fact that the top tether

3 is not connected to the anchor point of the vehicle or is not tensioned after being connected to the anchor point of the vehicle, thereby improving use reliability of the child safety seat.

Referring to FIG. 3, FIG. 5, and FIG. 6, the first locking member 41 may lock the headrest 2 in many manners. For example, in this embodiment, the headrest 2 is provided with a plurality of locking holes 20 in the height direction H of the headrest 2. The plurality of locking holes 20 are arranged on, for example, the hanging board portion 22 of the headrest 2. Center lines of the locking holes 20 intersect with the height direction H. In some embodiments, for example, the center lines of the locking holes 20 are perpendicular to the height direction H. The backrest portion 12 is provided with a first through hole 120. The first locking member 41 is, for example, a lock pin in sliding fit with the first through hole 120. When the first locking member 41 is at the lock position (see FIG. 5), the first locking member 41 is inserted into the corresponding locking hole 20 to lock the headrest 2, so as to restrict the height adjustment of the headrest 2. When the first locking member 41 is at the unlock position (see FIG. 6), the first locking member 41 exits the corresponding locking hole 20 to unlock the headrest 2, so as to allow the height adjustment of the headrest 2.

The number of the locking holes 20 may be set to two, three, or more as required. In some embodiments, the hanging board portion 22 of the headrest 2 is provided with a plurality of locking holes 20. The plurality of locking holes 20 corresponds to the height adjustment gears of the headrest 2 respectively, so that when the headrest 2 is at any positioning height, the second locking apparatus can lock the movement of the headrest 2 relative to the backrest portion 12 in the height direction H, and the loose top tether 3 allows the first locking member 41 of the first locking apparatus 4 to be inserted the corresponding locking hole 20, enabling the first locking apparatus 4 to also lock the movement of the headrest 2 relative to the backrest portion 12 in the height direction H. In this way, when the headrest 2 is at any height adjustment gear, the height of the headrest 2 can be adjusted by unlocking the second locking apparatus. However, if the height of the headrest 2 cannot be adjusted after the second locking apparatus is unlocked, it may be known that the headrest 2 may be locked by the first locking apparatus 4, and then it may be known that the top tether 3 may not be connected to the anchor point of the vehicle and/or the top tether 3 is not tensioned.

Referring to FIG. 5 and FIG. 6 again, a preferred embodiment of the first elastic member 42 is illustrated. The first elastic member 42 may be a spring located in the first through hole 120 and sleeve the first locking member 41. A hole wall of the first through hole 120 may be provided with a first step 1201 for limiting an end of the first elastic member 42, and a periphery of the first locking member 41 may be provided with a second step 411 for limiting the other end of the first elastic member 42. The first elastic member 42 is clamped between the first step 1201 and the second step 411.

Still referring to FIG. 5 and FIG. 6, in this embodiment, top tether 3 is operatively connected to the first locking member 41 by a flexible connector 5. The connector 5 may be, for example, a flexible belt or a flexible chain. The flexible belt may be, for example, a braided belt, and the flexible chain is, for example, a metal chain. A first end of the connector 5 is connected to the first end 301 of the top tether 3, for example, through a first hook-like member (not labeled in figures), a second end of the connector 5 is connected to a connecting ring 4101 on the first locking member 41, for example, through a second hook-like member (not labeled in figures), and the connector 5 is connected, in a curved shape, between the top tether 3 and the first locking member 41. It may be understood that, when the top tether 3 connected to the anchor point of the vehicle is tensioned, the first end 301 of the top tether 3 moves upwards and applies a pulling force F1 to the connector 5, and the connector 5 moves with the top tethering 3 and applies a pulling force F2 to the first locking member 41, so that the first locking member 41 moves from the lock position in FIG. 5 to the unlock position in FIG. 6. When the top tether 3 is in a loose state, the first elastic member 42 may drive the first locking member 41 to move from the unlock position shown in FIG. 6 to the lock position shown in FIG. 5.

Referring to FIG. 4 and FIG. 5, an angle is formed between the pulling force F1 and the pulling force F2, and the connector 5 is in a curved shape accordingly. In order to reduce an abrasion caused by contact between the curved connector 5 and an end of the first through hole 120, in some embodiments, the end of the first through hole 120 is provided with an arc-shaped structure 1202 for contact with the connector 5. The arc-shaped structure 1202 may be made of a material with a small friction coefficient and a wear resistance. In addition, since two ends of the connector 5 are respectively hooked with the first locking member 41 and the top tether 3, when the connector 5 is damaged, a new connector 5 can be easily replaced. Alternatively, in other embodiments, the connector 5 may also be connected with the top tether 3 and the first locking member 41 in any other appropriate manner. Alternatively, in some embodiments, the connector 5 may not be provided, and the top tether 3 is, for example, directly connected to the first locking member 41.

FIG. 1 to FIG. 3 and FIG. 7 to FIG. 11 illustrate a child safety seat 100 according to a second embodiment of the present application, which includes a seat housing 1, a headrest 2, a top tether 3, and a first locking apparatus 4. This embodiment is mainly different from the first embodiment in the manner in which the top tether 3 is operably connected to the first locking member 41. Without conflict, structures and connection relationships between the components in this embodiment may be obtained with reference to the description in the first embodiment above. Therefore, the content in this embodiment the same as or similar to that in the first embodiment is not described in detail herein again.

Figure 8:
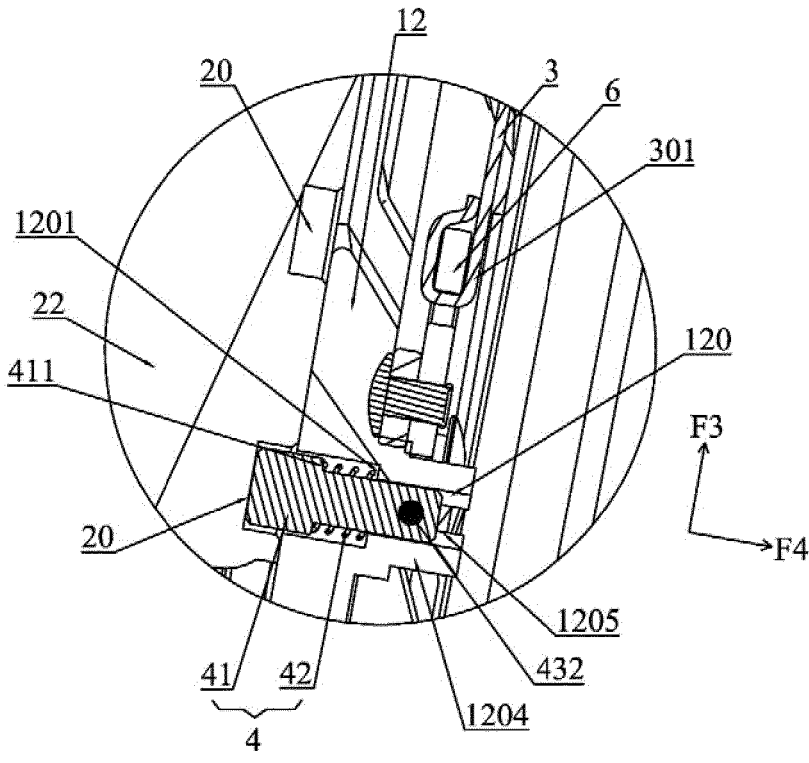
FIG. 8 is an enlarged view of an area marked by B in FIG. 7, in which the first locking member is at the lock position.
Figure 9:
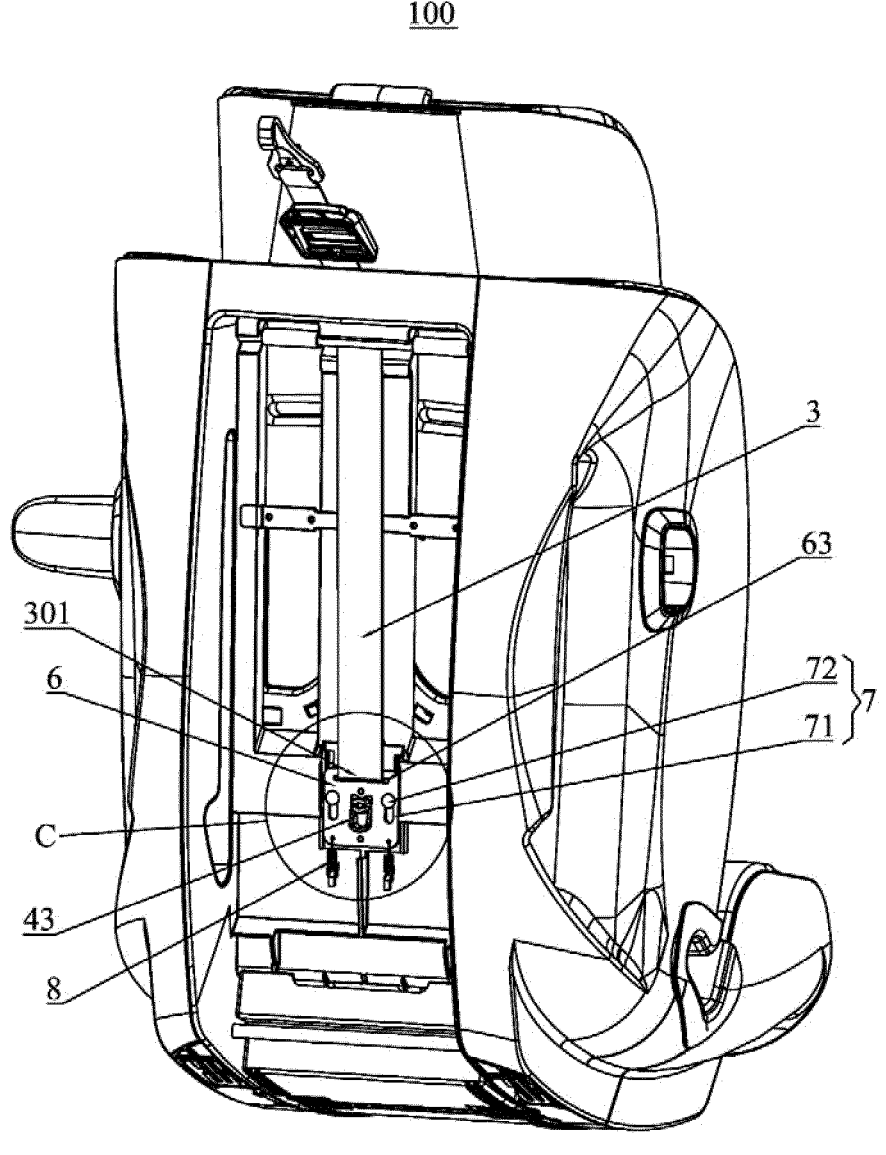
FIG. 9 schematically illustrates a back view of the child safety seat according to the second embodiment of the present application.
Figures 10, 11:
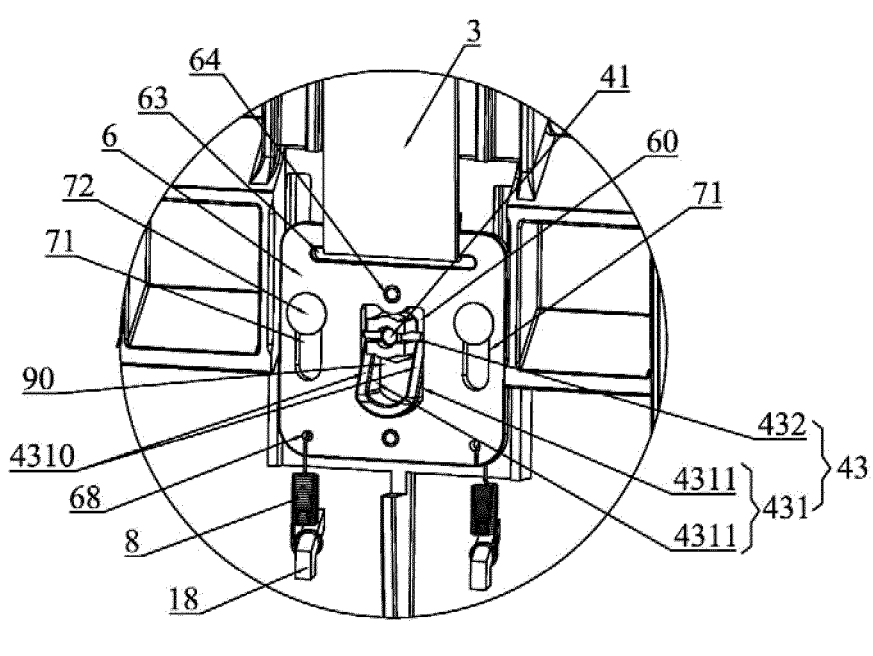
FIG. 10 is an enlarged view of an area marked by C in FIG. 9.
FIG. 11 schematically illustrates a partial exploded view of the child safety seat according to the second embodiment of the present application.

Referring to FIG. 8 and FIG. 9, the first end 301 of the top tether 3 is connected with a slider 6, and the second end 302 of the top tether 3 extends from the top of the backrest portion 12 to be connected to the anchor point of the vehicle. Referring to FIG. 10 and FIG. 11, the slider 6 is of a plate-shaped structure, an upper part of the slider 6 is provided with, for example, a belt hole 63, and the first end 301 of the top tether 3 (see FIG. 9) may be inserted the belt hole 63 and then sewn on the top tether 3. The slider 6 is in sliding fit with the backrest portion 12 in a manner of being capable of moving up and down, and a predetermined angle is formed between a movement direction of the slider 6 and a movement direction of the first locking member 41. The predetermined angle is, for example, 90°. In addition, the first locking apparatus 4 further includes a motion steering mechanism 43. The motion steering mechanism 43 is connected between the slider 6 and the first locking member 41 and configured to convert an upward movement of the slider 6 into a movement of the first locking member 41 from the lock position to the unlock position. More specifically, referring to FIG. 8 to FIG. 10 together, when the top tether 3 is tensioned, the slider 6 moves upwards under a pulling force F3 of the top tether 3, and applies an axial force F4 to the first locking member 41 through the motion steering mechanism 43, so that the first locking member 41 moves from the lock position shown in FIG. 8 to the unlock position (not shown). When the top tether 3 is in a loose state, the first elastic member 42 may drive the first locking member 41 to move from the unlock position to the lock position shown in FIG. 8. For example, the first locking member 41 may convert its own movement from the unlock position to the lock position into the downward movement of the slider 6 through the motion steering mechanism 43.

Referring to FIG. 9 and FIG. 10, in this embodiment, a sliding limit structure 7 is further arranged between the backrest portion 12 and the slider 6 to limit a range of the upward and downward movements of the slider 6, so as to prevent damages to the first locking member 41 caused by an excessive movement of the slider 6. In some embodiments, the sliding limit structure 7 may include a first elongated hole 71 and a pin 72. The first elongated hole 71 may be arranged on the slider 6. The pin 72 may be mounted on the backrest portion 12 and in sliding fit with the first elongated hole 71. The first elongated hole 71 defines the range of the upward and downward movements of the slider 6. The fit between the first elongated hole 71 and the pin 72 may guide the sliding of the slider 6. It may be understood that the slider 6 and the backrest portion 12 may be in sliding fit in many manners and the range of the sliding of the slider 6 may be limited in many forms. For example, in an unshown embodiment, a sliding slot in sliding fit with the slider 6 may be arranged on the backrest portion 12, and stoppers for stopping the slider 6 may be arranged at two ends of the sliding slot, respectively.

Referring to FIG. 10, the child safety seat 100 may further include a second elastic member 8. The second elastic member 8 is connected between the backrest portion 12 and the slider 6. When the top tether 3 is pulled upwards to be tensioned, the slider 6 moves upwards, and the second elastic member 8 applies a downward force to the slider 6. It may be understood that, when the top tether 3 changes from tension to looseness, the second elastic member 8 directly drives the slider 6 to slide downwards. The first elastic member 42 may be configured mainly to ensure that the first locking member 41 is smoothly returned and inserted into the locking hole 20 to return to the lock position, so as to limit the height adjustment of the headrest 2. In this embodiment, the second elastic member 8 may be a spring. For the convenience of fixing the second elastic member 8, a second through hole 68 may be arranged on the slider 6, and a hook-shaped cantilever 18 may be arranged on the backrest portion 12. The hook-shaped cantilever 18 is located below the second through hole 68, and two ends of the second elastic member 8 may be connected to the second through hole 68 and the hook-shaped cantilever 18, respectively.

Referring to FIG. 8, FIG. 10, and FIG. 11, a preferred embodiment of the motion steering mechanism 43 is illustrated, which includes a lifting portion 431 and a driving pin 432. The lifting portion 431 may be attached to or integrally formed with the slider 6, and the driving pin 432 may be attached to or integrally formed with the first locking member 41. The lifting portion 431 is provided with a lifting slope 4310 extending away from the backrest portion 12. The slider 6 is provided with a second elongated hole 60, the first locking member 41 passes through the second elongated hole 60. The driving pin 432 abuts against the lifting slope 4310. In this way, when the slider 6 moves upwards, as different positions of the lifting slope 4310 contact the driving pin 432, the driving pin 432 drives the first locking member 41 to exit the locking hole 20 to reach the unlock position. Conversely, when the slider 6 moves downwards, the lifting slope 4310 allows the first locking member 41 to be inserted into the corresponding locking hole 20 to reach the lock position. Alternatively, there may also be many implementations of the motion steering mechanism 43, provided that the upward and downward movements of the slider 6 correspond to the axial movement of the first locking member 41 along the first through hole 120, so as to be capable of unlocking or locking the headrest 2.

Referring to FIG. 10 and FIG. 11, in this embodiment, an axial direction of the driving pin 432 is substantially perpendicular to that of the first locking member 41. The first locking member 41 is provided with, for example, a first hole 410, and the middle of the driving pin 432 is positioned in the first hole 410, so that the driving pin 432 is attached to the first locking member 41. In addition, in this embodiment, the lifting portion 431 may be arranged on a mounting plate 9. The mounting plate 9 is provided with, for example, a fixed hole 91. The slider 6 is provided with, for example, a first mounting hole 64. The mounting plate 9 is fixedly connected to the slider 6, for example, through a fastener 69 being inserted into the fixed hole 91 and the first mounting hole 64, so that the lifting portion 431 is attached to the slider 6.

Still referring to FIG. 10 and FIG. 11, in this embodiment, the lifting portion 432 may be formed by a U-shaped rib arranged on the mounting plate 9, the lifting slopes 4310 are formed on two opposite wall bodies 4311 of the U-shaped rib, and the U-shaped rib passes through the second elongated hole 60. The mounting plate 9 is provided with a third elongated hole 90 for the first locking member 41 to pass through. The third elongated hole 90 corresponds to an inner region of the U-shaped rib, whereby the first locking member 41 is located between the two opposite wall bodies 4311 of the U-shaped rib. Two ends of the driving pin 432 abut against the lifting slopes 4310 of the two opposite wall bodies 4311, respectively, so as to prevent the problem that the driving pin 432 cannot keep abutting against each lifting slope 4310 due to an undesired rotation of the first locking member 41, so that the driving pin 432 moves along the lifting slope 4310 in the axial direction of the first locking member 41 all the time to drive the first locking member 41 to exit the locking hole 20 to unlock the headrest 2 when the top tether 3 is tensioned, or allow the first locking member 41 to be inserted into the locking hole 20 to lock the headrest 2 when the top tether 3 is loosened.

Referring to FIG. 10 and FIG. 11 again, in order to make the first through hole 120 have a sufficient axial length for mounting the first locking member 41 and at the same time prevent an excessively thick housing wall of the backrest portion 12, in this embodiment, at least part of the hole wall of the first through hole 120 is formed by a boss 1204 protruding outwards from the backrest portion 12, the boss 1204 passes through the third elongated hole 90, and the boss 1204 may be provided with a guide groove 1205. The two ends of the driving pin 432 respectively pass through the corresponding guide groove 1205 to abut against the lifting slopes 4310 on the two opposite wall bodies 4311. It may be understood that the sliding fit of the driving pin 432 with the guide groove 1205 can also prevent the undesired rotation of the first locking member 41 and ensure a reliable contact between the driving pin 432 and the lifting slope 4310. Referring to FIG. 11, in some embodiments, the boss 1204 may be provided with sections 1203 in sliding fit with the two opposite wall bodies 4311 respectively, which can also guide the upward and downward movements of the slider 6.

The present application further provides a unshown third embodiment of the child safety seat 100. The third embodiment is mainly different from the second embodiment in that the lifting portion 431 and the slider 6 are of an integral structure. Without conflict, structures and connection relationships between the components in this embodiment may be obtained with reference to the description in the second embodiment above. Therefore, the content in this embodiment the same as or similar to that in the second embodiment is not described in detail herein again.

It may be understood that, since the lifting portion 431 and the slider 6 are of an integral structure, the mounting plate 9 and the fastener 69, the fixed hole 91, the third elongated hole 90, and other structures associated with the mounting plate 9 can be omitted. The lifting portion 431 may still be formed by the U-shaped rib, and the lifting slopes 4310 are formed on two opposite wall bodies 4311 of the U-shaped rib. In this embodiment, the U-shaped rib may be arranged around the second elongated hole 60, and the boss 1204 passes through the second elongated hole 60, so that the driving pin 432 extending from the guide groove 1205 of the boss 1204 abuts against the lifting slope 4310. Same as the second embodiment, when the top tether 3 is tensioned, the slider 6 may move upwards under the pulling force F3 of the top tether 3, and under the cooperation of the driving pin 432 and the lifting slope 4310, the first locking member 41 overcomes the elastic force of the first elastic member 42 and moves from the locking position shown in FIG. 8 to the unlock position (not shown), so as to allow the height adjustment of the headrest 2. When the top tether 3 is in the loose state, the first elastic member 42 may drive the first locking member 41 to move from the unlock position to the lock position shown in FIG. 8, and under the cooperation of the driving pin 432 and the lifting slope 4310 and the action of the elastic restoring force of the second elastic member 8, the sliding member 6 may move downwards, so as to still be capable of moving upwards to drive the first locking member 41 to unlock the headrest 2 next time the top tether 3 is tensioned.

FIG. 12 to FIG. 17 illustrate the child safety seat 100 according to a fourth embodiment of the present application, which includes a seat housing 1, a headrest 2, a safety belt 40, a top tether 3, a third locking apparatus 50, and a fourth locking apparatus 70.

Figure 12:
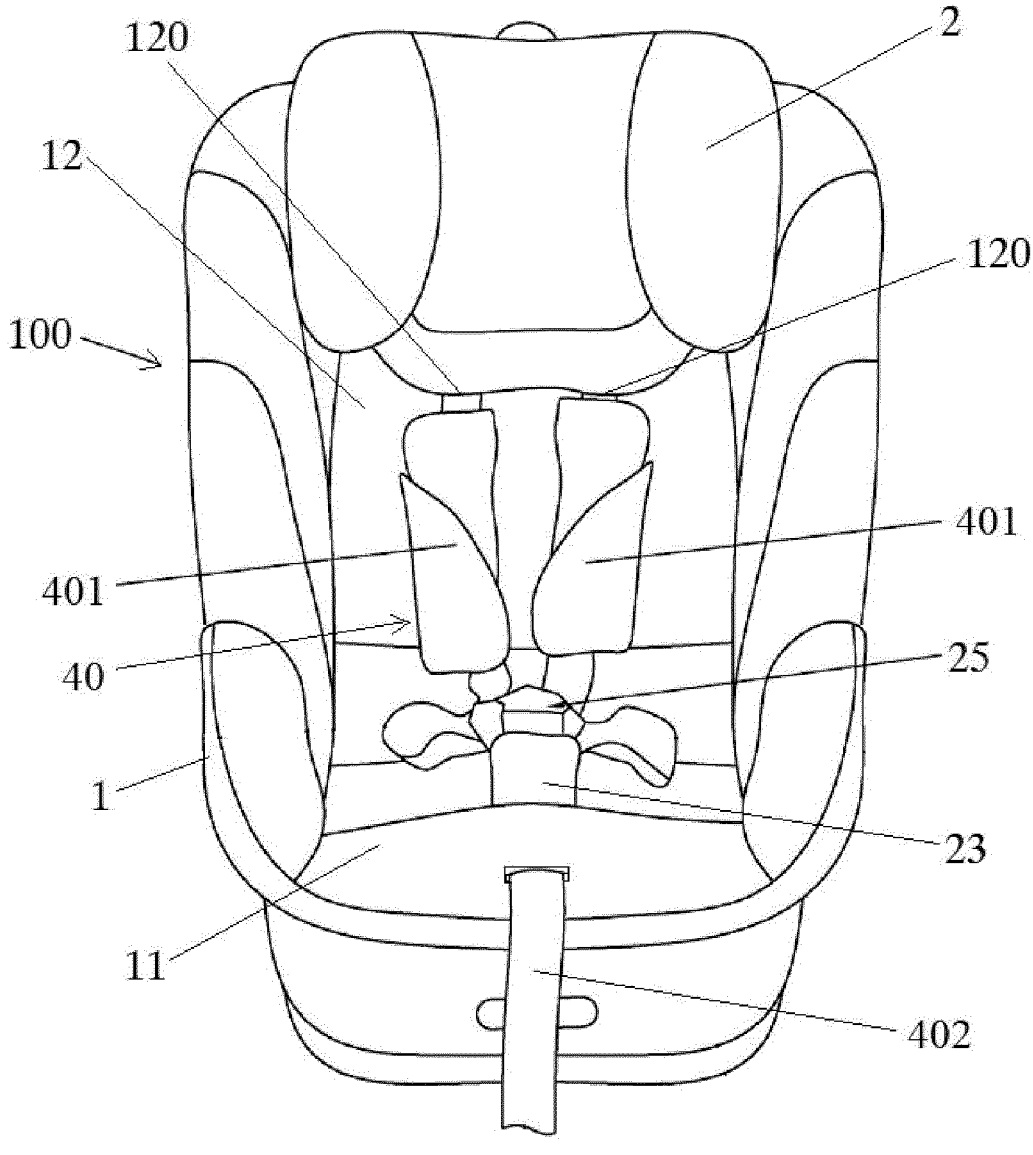
FIG. 12 schematically illustrates a front view of the child safety seat according to a fourth embodiment of the present application.
Figure 13:
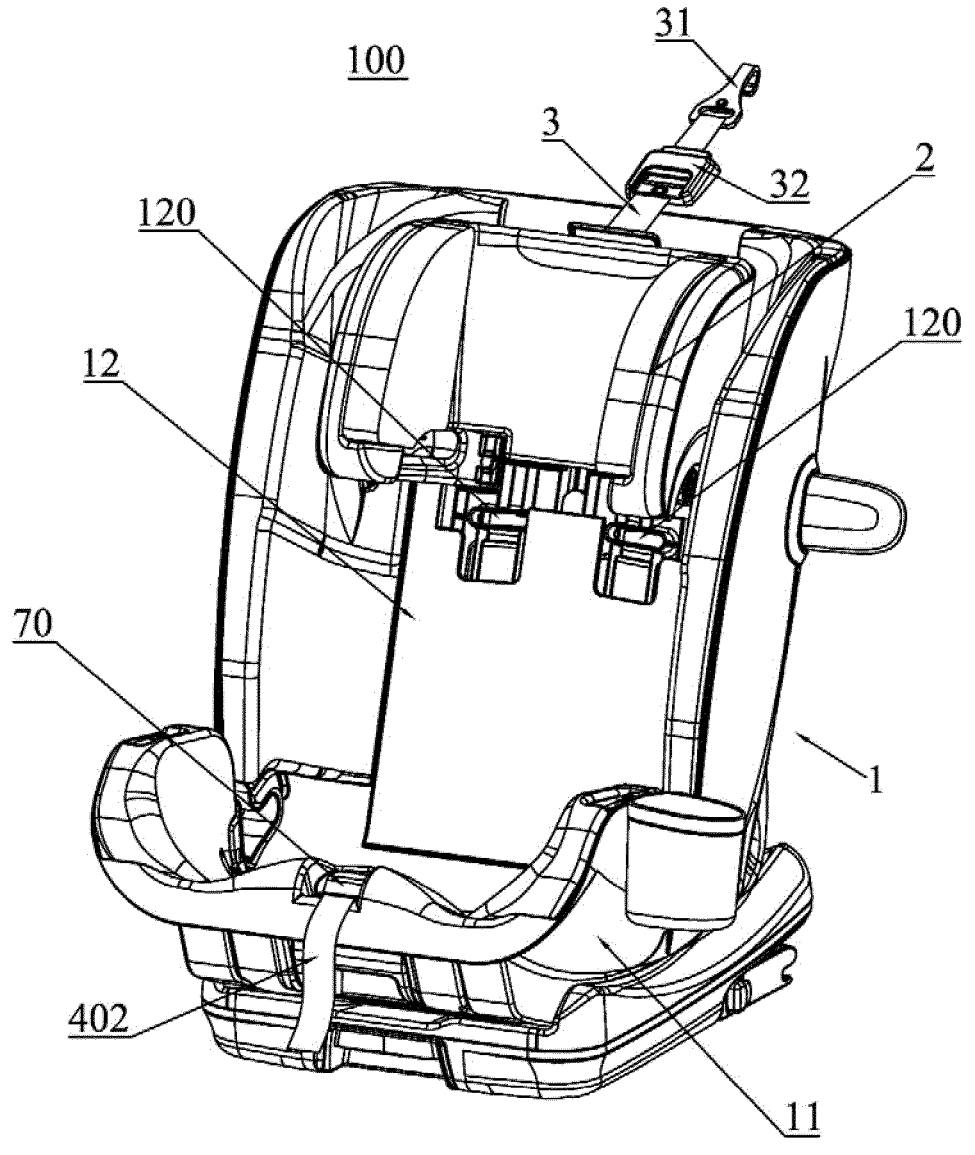
FIG. 13 schematically illustrates a perspective view of the child safety seat according to the fourth embodiment of the present application, in which a shoulder belt is not shown.
Figure 14:
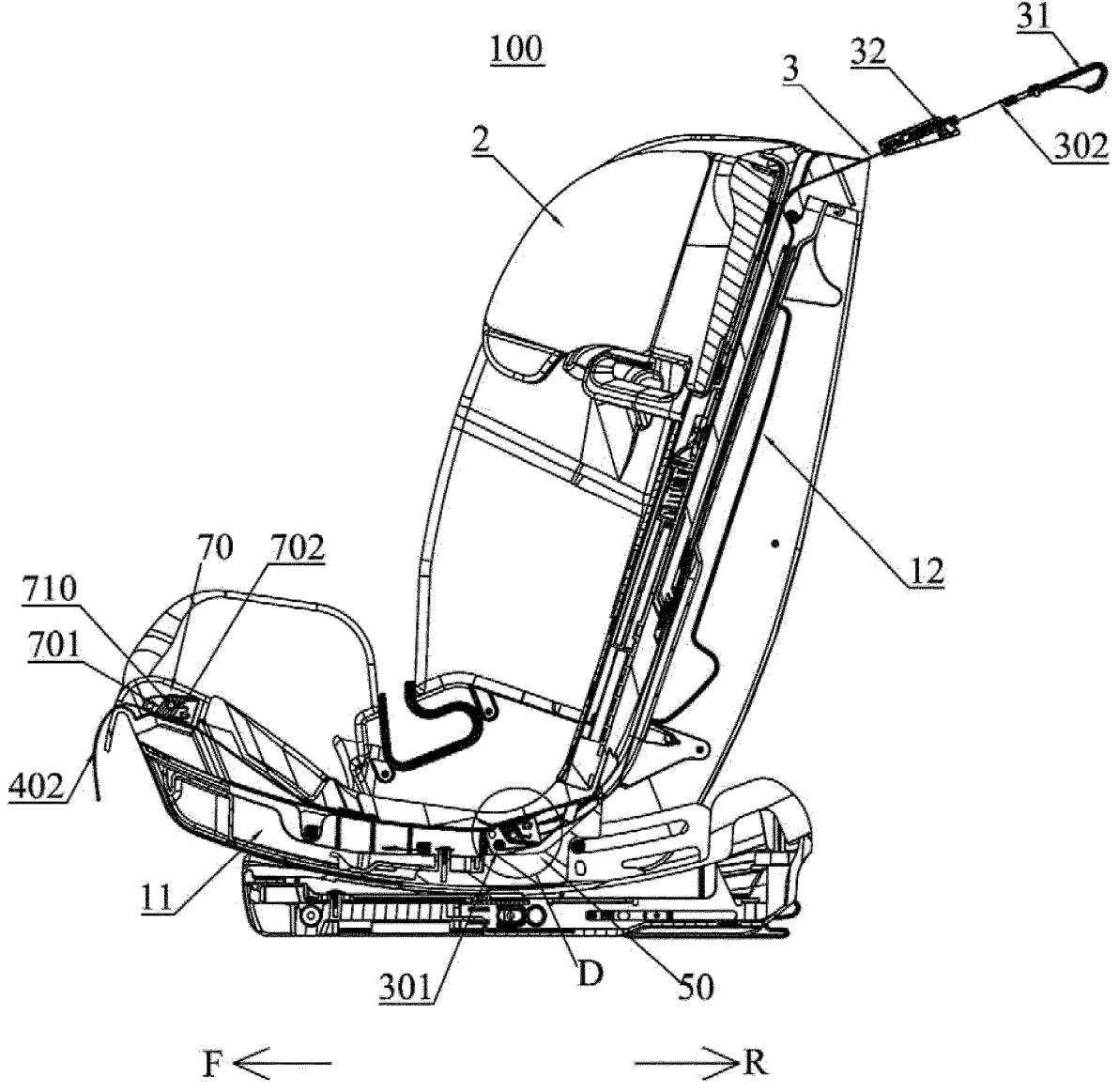
FIG. 14 schematically illustrates a sectional view of the child safety seat according to the fourth embodiment of the present application, in which the shoulder belt is not shown.

Referring to FIG. 12 and FIG. 13, the seat housing 1 is configured in a shape of a seat for accommodating a child, and may be selectively mounted on a vehicle seat (not shown in figures) in a forward or backward manner, for example. Alternatively, in other embodiments, the seat housing 1 may be mounted on the vehicle seat only in the forward manner. It may be understood that, when the seat housing 1 is mounted on the vehicle seat in the forward manner, sight line of the child accommodated therein is towards the front of the vehicle, and when the seat housing 1 is mounted on the vehicle seat in the backward manner, the sight line of the child accommodated therein is towards the back of the vehicle. It is to be noted that the orientation terms "front" and "back" as referred to in this embodiment refer to the front and the back when the seat housing 1 is mounted in the forward manner. In FIG. 14, an arrow F indicates a forward direction, and an arrow R indicates a backward direction. These terms are intended only to clearly illustrate the solutions of the embodiments of the present application, and are not intended to improperly limit the present application. The seat housing 1 includes a seat portion 11 and a backrest portion 12. Two sides of the seat portion 11 may be provided with armrests. In some embodiments, the seat housing 1 may be provided with a seat cushion and/or a back cushion to provide comfort and/or extra security for the seated child.

Referring to FIG. 12, the safety belt 40 is attached to the seat housing 1. The safety belt 40 includes, for example, a shoulder belt 401 and an adjustment belt 402 connected with each other. Two shoulder belts 401 are generally provided. The two shoulder belts 401 correspond to the child's two shoulders. Front sides of the two shoulder belts 401 are detachably engaged with a crotch belt 23 of the child safety seat, for example, through a buckle 25, so as to tie the child in the seat housing 1. Back sides of the two shoulder belts 401 respectively pass through shoulder belt holes 420 on an upper part of the backrest portion 12 and then extend downwards behind the backrest portion 12, and may be connected with an end of the adjustment belt 402 through any suitable connecting mechanism (not shown in figures). Referring to FIG. 13 and FIG. 14 together, the other end of the adjustment belt 402 extends forward at the bottom of the seat portion 11, and passes through the fourth locking apparatus 70 arranged at a front end of the seat portion 11. In some embodiments, by unlocking the fourth locking apparatus 70, the shoulder belt 401 may be pulled outwards (in this case, the adjustment belt 402 retracts into the seat portion 11), so that a use section of the shoulder belt 401 (the part of the shoulder belt 401 used for contact with the child) becomes longer to facilitate the child to take a seat. After the child is seated, the shoulder belt 401 is engaged with the crotch belt 23 through the buckle 25, and the adjustment belt 402 is pulled outwards, so that the shoulder belt 401 tightens the child to reliably tie the child in the seat housing 1.

Referring to FIG. 14, in some embodiments, the fourth locking apparatus 70 may include a fourth locking member 701 and a fourth elastic member 702. When the fourth locking apparatus 70 is in a locked state, the fourth locking member 701 abuts against the adjustment belt 402 to limit a movement of the adjustment belt 402 in at least one direction (e.g., in a direction of retracting into the seat portion 11). The fourth elastic member 702 is configured to keep the fourth locking member 701 at the lock position abutting against the adjustment belt 402.

For example, in some embodiments, the fourth locking member 701 may include ratchet teeth (not labeled in figures) and a second pivot shaft 710, and the fourth elastic member 702 may be a torsion spring. Under the action of the fourth elastic member 702, the ratchet teeth of the fourth locking member 701 abut against the adjustment belt 402, thereby allowing the adjustment belt 402 to be pulled outwards from the seat portion 11 to tension the shoulder belt 401, and not allowing the adjustment belt 402 to retract into the seat portion 11 by pulling the shoulder belt 401 to prevent an accidental loosening of the shoulder belt 401. When the shoulder belt 401 is required to be loosened, the fourth locking apparatus 70 may be controlled to be in an unlocked state by pressing the fourth locking member 701, so that the fourth locking member 701 overcomes the action of the fourth elastic member 702 and no longer abuts against the adjustment belt 402. In this case, the shoulder belt 401 can be easily pulled, so that the adjustment belt 402 retracts into the seat portion 11, and the use section of the shoulder belt 401 becomes longer. Alternatively, in other embodiments, the fourth locking apparatus 70 may also have other implementations. For example, when the fourth locking apparatus 70 is in the locked state, neither the outward pulling movement nor the inward retracting movement of the adjustment belt 402 is allowed. The structures of the safety belt 40 and the fourth locking apparatus 70 are much involved in the known arts, thus details are not described herein again.

Referring to FIG. 13 and FIG. 14, the top tether 3 is attached to the seat housing 1. In some embodiments, a first end 301 of the top tether 3 is connected to any suitable position of the seat housing 1, and a second end 302 of the top tether 3 may extend from the top of the backrest portion 12 and may be provided with a hook 31. The hook 31 is configured for direct or indirect engagement with the anchor point in the vehicle. A length of the top tether 3 may be adjusted through, for example, an adjustment buckle 32. After the top tether 3 is engaged with the anchor point in the vehicle, the top tether 3 can be easily tensioned through the adjustment buckle 32, so that the top tether 3 is capable of fixing the seat housing 1.

Figure 15:
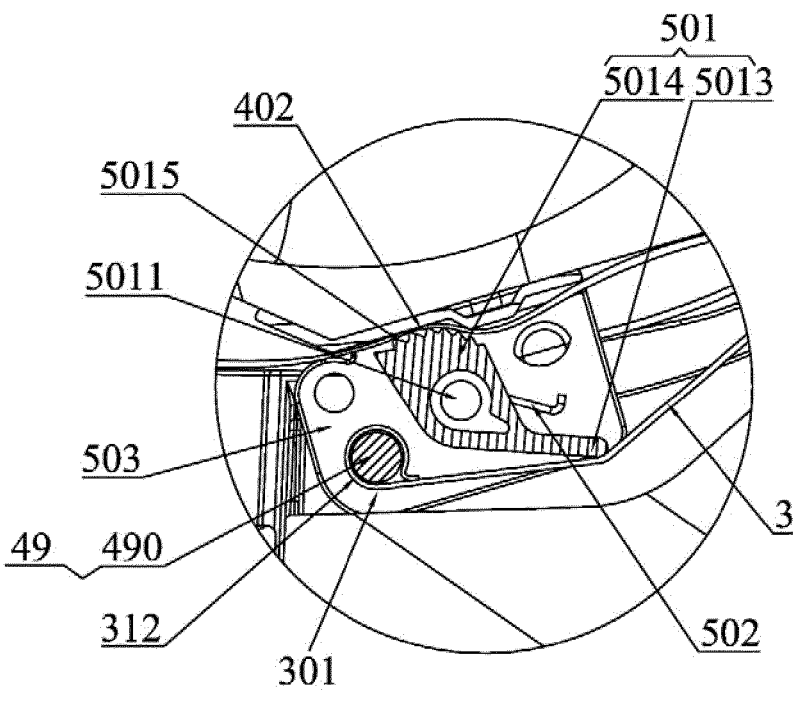
FIG. 15 is an enlarged view of an area marked by D in FIG. 14, in which the first locking member is at the lock position.
Figure 16:
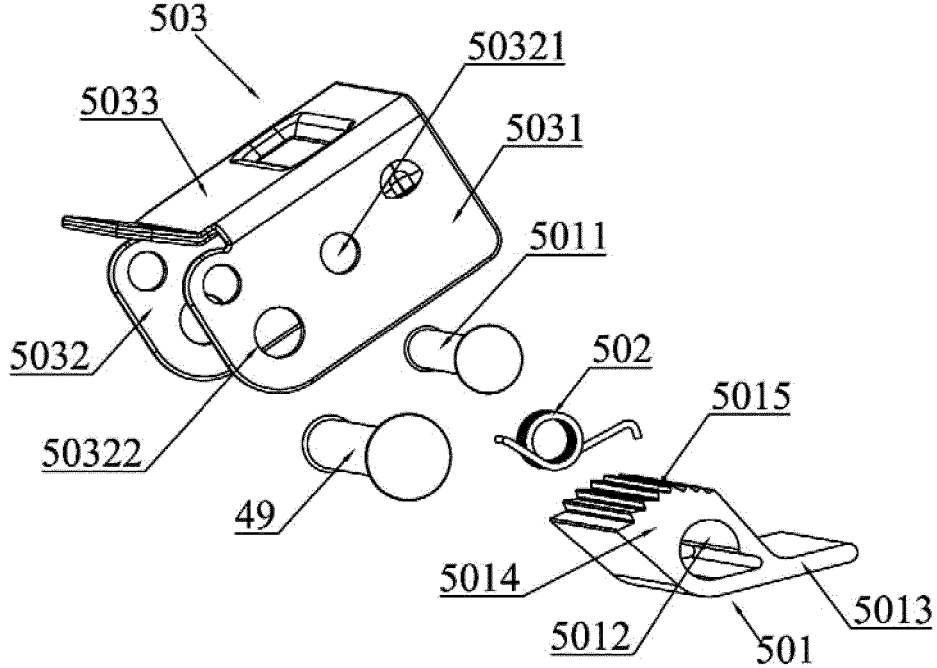
FIG. 16 schematically illustrates an exploded view of a first locking apparatus in the child safety seat according to the fourth embodiment of the present application.
Figure 17:
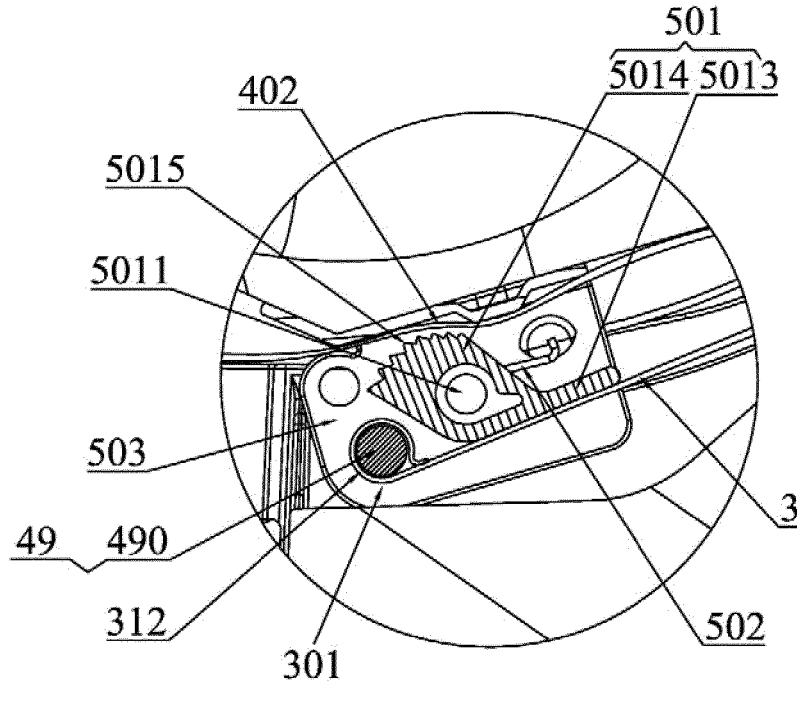
FIG. 17 is an enlarged view of the area marked by D in FIG. 14, in which the first locking member is at the unlock position.

Referring to FIG. 15 to FIG. 17, the third locking apparatus 50 is arranged on a path of the adjustment belt 402 to act on the adjustment belt 402. Specifically, the third locking apparatus 50 may include a third locking member 501 and a third elastic member 502. Referring to FIG. 15, when the third locking apparatus 50 is in a locked state, the third locking member 501 is at a lock position for locking the adjustment belt 402. Referring to FIG. 17, when the third locking apparatus 50 is in an unlocked state, the third locking member 501 is at an unlock position for unlocking the adjustment belt 402. The third elastic member 502 acts on the third locking member 501 to keep the third locking member 501 at the lock position. The third locking member 501 is associated with the top tether 3. The top tether 3 is configured to act on the third locking member 501 when tensioned, so that the third locking member 501 overcomes force of the third elastic member 502 to switch from the lock position to the unlock position. It may be understood that, when the top tether 3 is in a loose state, the third locking member 501 may automatically switch from the unlock position to the lock position under the action of the third elastic member 502.

Referring to FIG. 14, it is to be noted that the third locking apparatus 50 may be an additional locking mechanism added to the child safety seat 100 on the basis of the fourth locking apparatus 70 and capable of acting on the adjustment belt 402. For example, the third locking apparatus 50 is located in the seat portion 11 and behind the fourth locking apparatus 70. The position of the third locking member 501 of the third locking apparatus 50 is related to whether the top tether 3 is tensioned. More specifically, even if the fourth locking apparatus 70 is in the unlocked state, when the third locking member 501 is at the lock position due to the untensioned top tether 3, at least one of the outward pulling movement and the inward retraction movement of the adjustment belt 402 relative to the seat portion 11 may be restricted by the third locking apparatus 50.

For example, in some embodiments, when the third locking member 501 is at the lock position, the third locking apparatus 50 may simultaneously restrict the outward pulling movement and the inward retraction movement of the adjustment belt 402. In this case, even if the fourth locking apparatus 70 is in the unlocked state, the shoulder belt 401 is also in an unadjustable state. In some other embodiments, when the third locking member 501 is at the lock position, the third locking apparatus 50 allows the adjustment belt 402 to be pulled outwards to shorten the use section of the shoulder belt 401, but does not allow the adjustment belt 402 to retract inwards. In some other embodiments, when the third locking member 501 is at the lock position, the third locking apparatus 50 does not allow the adjustment belt 402 to be pulled outwards, but allows the shoulder belt 401 to be pulled to cause the adjustment belt 402 to retract inwards, so that the use section of the shoulder belt 401 can be lengthened.

It may be understood that, referring to FIG. 17, when the top tether 3 is tensioned, the top tether 3 acts on the third locking member 501, so that the third locking member 501 overcomes a force of the third elastic member 502 to switch from the lock position to the unlock position. In this case, the third locking member 501 does not restrict the outward pulling movement and the inward retraction movement of the adjustment belt 402, and the parent may decide, as required, whether to operate the fourth locking apparatus 70 to adjust the shoulder belt 401.

In the prior art, when the child safety seat is in use, due to the complexity of the operation of securing the child safety seat in the vehicle seat and tying the child in the child safety seat, an inexperienced parent sometimes may forget to tension the top tether or even forget to engage the top tether with the anchor point. In this case, the top tether not properly mounted cannot secure the child safety seat. As a result, the child safety seat cannot reliably protect the child.

Referring to FIG. 12, FIG. 15, and FIG. 17, when the child is seated in the child safety seat 100 provided with the third locking apparatus 50 according to the embodiment of the present application, the parent is generally required to adjust the use section of the shoulder belt 401. Generally, the shoulder belt 401 is pulled at first, so as to make the use section of the shoulder belt 401 longer, so that the shoulder belt 401 may be easily worn on the child, and then the adjustment belt 402 is pulled, so that the shoulder belt 401 fits snugly against the child. If the top tether 3 is not connected to the anchor point of the vehicle or the top tether 3 is not tensioned, the third locking member 501 keeps locking the adjustment belt 402. In this case, even if the fourth locking member 701 is at the unlock position, the parent may find that the height of the shoulder belt 401 and/or the adjustment belt 402 still cannot be adjusted, which may prompt the parent to find out why the height of the shoulder belt 401 and/or the adjustment belt 402 cannot be adjusted. For example, by reading an instruction manual, or through a labeling reminder on the child safety seat 100, the parent can easily know that the adjustment of the height of the shoulder belt 401 and/or the adjustment belt 402 is related to whether the top tether 3 is tensioned, so as to check mounting and tensioning conditions of the top tether 3, which can effectively prevent potential safety hazards caused by the fact that the top tether 3 is not connected to the anchor point of the vehicle or is not tensioned after being connected to the anchor point of the vehicle, thereby improving use reliability of the child safety seat.

Referring to FIG. 15 to FIG. 17, a preferred embodiment of the third locking apparatus 50 is illustrated. The third locking member 501 may have a first pivot shaft 5011. The third locking member 501 may be conveniently switched between the lock position and the unlock position by rotating around the first pivot shaft 5011. The first pivot shaft 5011 and the third locking member 501 may be an integral structure or formed independently. In some embodiments, as shown in FIG. 16, the third locking member 501 is provided with a hole 5012, and the first pivot shaft 5011 is sleeved in the hole 5012. The third elastic member 502 may be, for example, a torsion spring sleeving the first pivot shaft 5011 and acting on the third locking member 501. The third locking member 501 is provided with a pressing portion 5013 and an abutting portion 5014. The third locking member 501 is, for example, an integrally formed member.

The pressing portion 5013 is configured to bear a driving force from the tensioned top tether 3 to drive the third locking member 501 to switch from the lock position to the unlock position. The abutting portion 5014 locks the adjustment belt 402 by abutting against the adjustment belt 402 when the third locking member 501 is at the lock position. In this case, the adjustment belt 402 is clamped between the abutting portion 5014 and a wall body opposite to the abutting portion 5014. Preferably, the abutting portion 5014 is provided with a toothed portion 5015 suitable for engagement with the adjustment belt 402, which can increase a frictional force between the abutting portion 5014 and the adjustment belt 402. In some embodiments, the toothed portion 5015 may be a ratchet tooth, so that the third locking member 501 allows the adjustment belt 402 to be pulled outwards or retracted inwards when at the lock position.

Referring to FIG. 15 and FIG. 17, in some embodiments, the first end 301 of the top tether 3 is connected to a fixed point 490, and the second end 302 of the top tether 3 is connected with the anchor point in the vehicle through the hook 31 as described above. The fixed point 490 is, for example, formed by a connecting rod 49 parallel to the first pivot shaft 5011, the first end 301 of the top tether 3 may be provided with a first ring 312, the first ring 312 is formed, for example, by sewing the top tether 3, and the first ring 312 sleeves the connecting rod 49, so that the first end 301 of the top tether 3 is connected to the connecting rod 49. The third locking member 501 is arranged close to the first end 301 of the top tether 3, the pressing portion 5013 of the third locking member 501 is located on a path of the top tether 3, and after the top tether 3 is tensioned, the third locking member 501 is driven to rotate from the lock position to the unlock position by pressing against the pressing portion 5013. It may be understood that, in other embodiments, the implementation of the fixed point 490 is not limited to the connecting rod 49, provided that the first end 301 of the top tether 3 can be fixed.

Referring to FIG. 16, in some embodiments, the third locking apparatus 50 may further include a bracket 503. The bracket 503 is connected to the seat housing 1. The bracket 503 includes a bottom plate 5033, and a first side plate 5031 and a second side plate 5032 opposite to each other. The bracket 503 is, for example, an integrally formed member. Two ends of the first pivot shaft 5011 are connected to the first side plate 5031 and the second side plate 5032, respectively. For example, the two ends of the first pivot shaft 5011 are mounted in third through holes 50321 in the first side plate 5031 and the second side plate 5032. Two ends of the connecting rod 49 may also be connected to the first side plate 5031 and the second side plate 5032, respectively. For example, the two ends of the connecting rod 49 are mounted in fourth through holes 50322 in the first side plate 5031 and the second side plate 5032. The adjustment belt 402 is arranged through a space between the third locking member 501 and the bottom plate 5033. When the third locking member 501 is at the lock position, the bottom plate 5033 acts as a wall body opposite to the abutting portion 5014, and the adjustment belt 402 is clamped between the abutting portion 5014 and the bottom plate 5033, so as to prevent a movement of the adjustment belt 402 in an undesired direction. With the arrangement of the bracket 503, the first pivot shaft 5011, the third locking member 501, the third elastic member 502, the connecting rod 49, etc. are mounted on the bracket 503, so that the third locking apparatus 501 can be easily mounted at any suitable position of the child safety seat as a module. It may be understood that, in other embodiments, the bracket 503 may not be provided, and the components, such as the first pivot shaft 5011, the connecting rod 49, etc., are directly mounted on the seat housing 1.

Referring to FIG. 15 again, in this embodiment, ratchet teeth of the toothed portion 5015 may be configured so that when the third locking member 501 is at the lock position, the third locking apparatus 50, like the fourth locking apparatus 70, allows the adjustment belt 402 to be pulled outwards but does not allow the adjustment belt 402 to retract inwards. In this way, when the parent needs to pull the shoulder belt 401 to make the use section of the shoulder belt 401 longer, if the top tether 3 is not tensioned, the shoulder belt 401 cannot be pulled even if the fourth locking apparatus 70 is unlocked, which can prompt the parent that the third locking apparatus 50 is still in the locked state and the top tether 3 is not tensioned. Alternatively, in other embodiments, the ratchet teeth of the toothed portion 5015 may be configured so that when the third locking member 501 is at the lock position, the third locking apparatus 50 allows the adjustment belt 402 to retract inwards but does not allow the adjustment belt 402 to be pulled outwards. In this way, after the shoulder belt 401 is worn on the child, when the parent needs to pull the adjustment belt 402 outwards to cause the shoulder belt 401 to tighten the child, the adjustment belt 402 cannot be pulled outwards if the top tether 3 is not tensioned, which can prompt the parent that the third locking apparatus 50 is still in the locked state and the top tether 32 is not tensioned.

Figure 18:
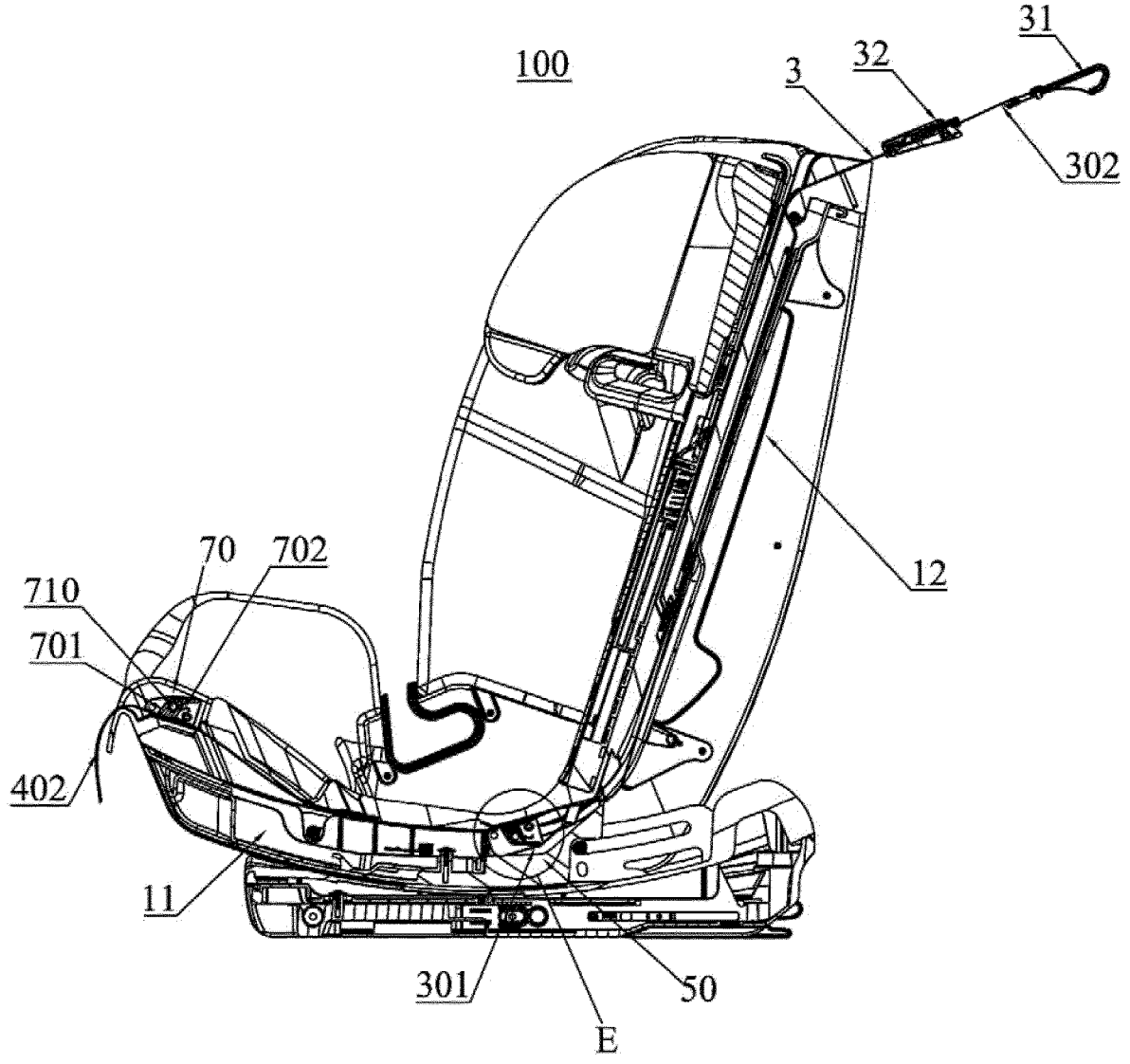
FIG. 18 schematically illustrates a sectional view of the child safety seat according to a fifth embodiment of the present application, in which the shoulder belt is not shown.
Figure 19:
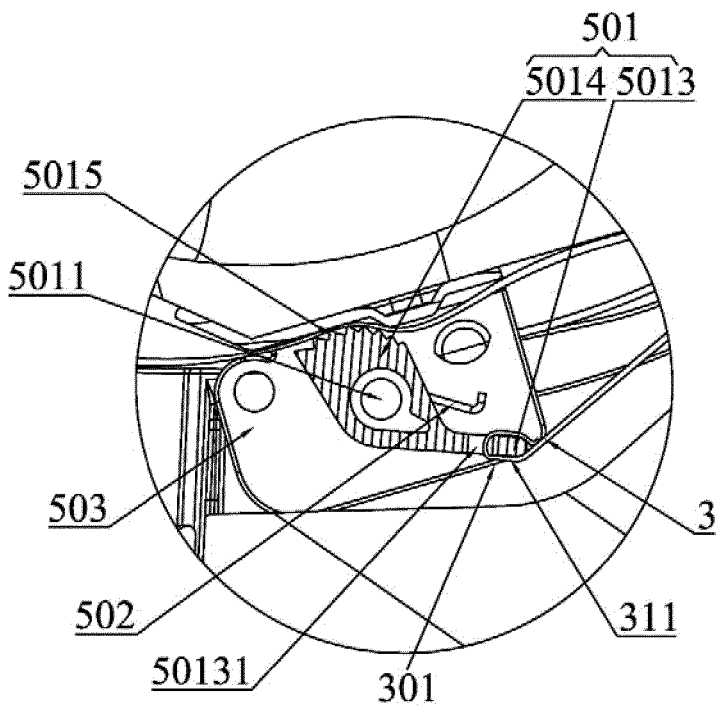
FIG. 19 is an enlarged view of an area marked by E in FIG. 18.
Figure 20:
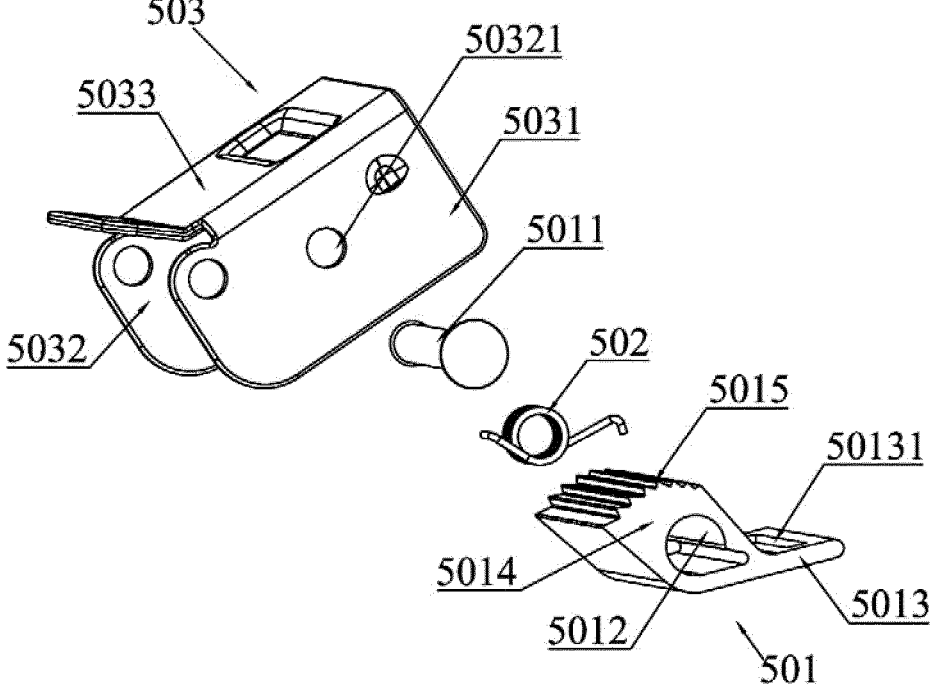
FIG. 20 schematically illustrates an exploded view of a first locking apparatus in the child safety seat according to the fifth embodiment of the present application.

FIG. 18 to FIG. 20 illustrate the child safety seat 100 according to a fifth embodiment of the present application. This embodiment is mainly different from the fourth embodiment in the manner in which the first end 301 of the top tether 3 is connected. Without conflict, structures and connection relationships between the components in this embodiment may be obtained with reference to the description in the fourth embodiment above. Therefore, the content in this embodiment the same as or similar to that in the fourth embodiment is not described in detail herein again.

Referring to FIG. 19, in this embodiment, the first end 301 of the top tether 3 may be connected to the pressing portion 5013 of the third locking member 501, and the connecting rod 49 configured to position the first end 301 of the top tether 3 in the fourth embodiment may not be mounted on the bracket 503. More specifically, the pressing portion 5013 of the third locking member 501 may be provided with a second mounting hole 50131, the first end of the top tether 3 is provided with a second ring 311 passing through the second mounting hole 50131, and the second ring 311 is formed, for example, by sewing the top tether 3. It may be understood that, when the top tether 3 is loosened, the third elastic member 502 keeps the third locking member 501 at the lock position, and the adjustment belt 402 is clamped between the abutting portion 5014 of the third locking member 501 and the bottom plate 5033 of the bracket 503. When the top tether 3 is tensioned, the first end 301 of the top tether 3 may drive the pressing portion 5013 to rotate, so that the third locking member 501 rotates to the unlock position, so as not to affect the movement of the adjustment belt 402.

It is to be noted that, although the third locking apparatus 50 is arranged on the path of the adjustment belt 402 to lock or unlock the adjustment belt 402 in the above embodiments, the third locking apparatus 50 may be arranged on, for example, a path of any shoulder belt 401 to lock or unlock the shoulder belt 401 in other embodiments, which is also helpful for the parent to judge whether the top tether 3 is connected to the anchor point of the vehicle and whether the top tether 3 is tensioned. It may be understood that embodiments in which the third locking apparatus 50 is configured to lock/unlock the shoulder belt 401 also fall within the protection scope of the present application.

In the child safety seat 100 according to the embodiments of the present application, when the top tether 3 is loosened, the third locking member 501 of the third locking apparatus 50 is at the lock position for locking the shoulder belt 401 or the adjustment belt 402 of the safety belt 40, so that the safety belt 40 is in a locked state where the length of the safety belt 40 cannot be adjusted arbitrarily. When the child is seated in the child safety seat 100, if the parent finds that the safety belt 40 cannot be adjusted as required, the parent may first check whether the top tether 3 is properly mounted, so as to promptly eliminate potential safety hazards caused by the fact that the top tether 3 is not connected to the anchor point of the vehicle or is not tensioned after being connected to the anchor point of the vehicle.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and their description is specific and detailed, but cannot therefore be understood as a limitation on the patent scope of the application. It should be noted that those of ordinary skill in the art may further make variations and improvements without departing from the conception of the present application, and these all fall within the protection scope of the present application. Therefore, the patent protection scope of the present application should be subject to the appended claims.

The invention claimed is:

1. A child safety seat, comprising:
   a seat housing;
   a headrest arranged on the seat housing in a height-adjustable manner;
   a top tether extending from a top of the seat housing for connection with an anchor point of a vehicle;
   a safety belt attached to the seat housing; and
   a locking apparatus arranged on the seat housing and including a locking member and an elastic member,
   wherein the locking member is switchable between a lock position for locking one of the headrest and the safety belt and an unlock position for unlocking said one of the headrest and the safety belt, and the elastic member acts on the locking member to keep the locking member at the lock position; and
   the top tether is configured to act on the locking member when tensioned, so that the locking member overcomes a force of the elastic member to switch from the lock position to the unlock position;
   the locking apparatus includes a first locking member and a first elastic member, the first locking member is switchable between a lock position for locking the headrest and an unlock position for unlocking the headrest, the first elastic member acts on the first locking member to keep the first locking member at the lock position; and
   the top tether is operably connected to the first locking member, and the top tether drives the first locking member to move when tensioned, so that the first locking member overcomes force of the first elastic member to switch from the lock position to the unlock position.

2. The child safety seat according to claim 1, wherein
the seat housing includes a backrest portion, the headrest
is arranged on the backrest portion in a height-adjust-
able manner, and the top tether extends from the top of
the backrest portion, and the locking apparatus is a first locking apparatus mounted
on the backrest portion.

3. The child safety seat according to claim 2, wherein
the headrest is provided with a plurality of locking holes
in a height direction of the headrest;

the backrest portion is provided with a first through hole,
and the first locking member is in sliding fit with the
first through hole; and when the first locking member is at the lock position, the
first locking member is inserted into the corresponding
locking hole to restrict a height adjustment of the
headrest; and when the first locking member is at the
unlock position, the first locking member exits the
corresponding locking hole to allow the height adjust-
ment of the headrest.

4. The child safety seat according to claim 2, wherein
a first end of the top tether is connected to the first locking
member through a connector, and a second end of the
top tether extends from the top of the backrest portion;

wherein the backrest portion is provided with a first
through hole, and the first locking member is in sliding
fit with the first through hole; and the connector includes a flexible belt or a flexible chain,
and an end of the first through hole is provided with an
arc-shaped structure for contact with the connector.

5. The child safety seat according to claim 2, wherein
a first end of the top tether is connected with a slider, and
a second end of the top tether extends from the top of
the backrest portion;

the slider is in sliding fit with the backrest portion in a
manner of being capable of moving upwards and
downwards, and a predetermined angle is formed
between a movement direction of the slider and a
movement direction of the first locking member; and the first locking apparatus further includes a motion
steering mechanism connected between the slider and
the first locking member and configured to convert an
upward movement of the slider into a movement of the
first locking member from the lock position to the
unlock position.

6. The child safety seat according to claim 5, wherein a
sliding limit structure is arranged between the backrest
portion and the slider;

wherein the sliding limit structure includes: a first elon-
gated hole arranged in the slider; and a pin mounted on
the backrest portion and in sliding fit with the first
elongated hole.

7. The child safety seat according to claim 5, wherein
the slider is provided with a second elongated hole for the
first locking member to pass through; and the motion steering mechanism includes:

a lifting portion connected to the slider and provided with
a lifting slope extending away from the backrest por-
tion; and a driving pin connected to the first locking member and
abutting against the lifting slope.

8. The child safety seat according to claim 7, wherein an
axial direction of the driving pin is perpendicular to that of
the first locking member, and the driving pin is attached to
or integrally formed with the first locking member.

9. The child safety seat according to claim 7, wherein at
least part of the hole wall of the first through hole is
surrounded by a boss protruding outwards from the backrest
portion.

10. The child safety seat according to claim 7, wherein
the lifting portion is formed by a U-shaped rib, and the
lifting slopes are formed on two opposite wall bodies of
the U-shaped rib; and the first locking member is located between the two
opposite wall bodies, and two ends of the driving pin
abut against the lifting slopes of the two opposite wall
bodies, respectively.

11. The child safety seat according to claim 10, wherein
the U-shaped rib is arranged on a mounting plate, the
mounting plate is fixedly connected to the slider; and the U-shaped rib passes through the second elongated
hole, and the mounting plate is provided with a third
elongated hole for the first locking member to pass
through.

12. The child safety seat according to claim 11, wherein
at least part of the hole wall of the first through hole is
surrounded by a boss protruding outwards from the
backrest portion, wherein the boss is in sliding fit with
the two opposite wall bodies; and the boss is provided with a guide groove for the driving
pin to pass through.

13. The child safety seat according to claim 2, wherein
the headrest has a plurality of positioning heights;

the child safety seat further includes a second locking
apparatus, the second locking apparatus is arranged
between the headrest and the backrest portion and
configured to lock the headrest to any of the positioning
heights; and when the headrest is at any of the positioning heights, a
loosed top tether allows the first locking member to
lock the headrest.

14. The child safety seat according to claim 13, wherein
the locking apparatus is a third locking apparatus includ-
ing a third locking member and a third elastic member,
the third locking member is switchable between a lock
position for locking the safety belt and an unlock
position for unlocking the safety belt, the third elastic
member acts on the third locking member to keep the
third locking member at the lock position, the top tether is configured to act on the third locking
member when tensioned, so that the third locking
member overcomes a force of the third elastic member
to switch from the lock position to the unlock position;

wherein the third locking member is provided with a first
pivot shaft, and the third locking member is switchable
between the lock position and the unlock position by
rotating around the first pivot shaft.

15. The child safety seat according to claim 14, wherein
the safety belt includes a shoulder belt and an adjustment
belt, which are connected with each other, the adjust-
ment belt enables the shoulder belt to tighten a child
when pulled outwards; and the third locking member is provided with a pressing
portion and an abutting portion, the pressing portion is
adapted to be driven by the top tether to rotate around
the first pivot shaft, the abutting portion locks the safety
belt by abutting against the adjustment belt.

16. The child safety seat according to claim 15, wherein
a first end of the top tether is connected to a fixed point,
and a second end of the top tether is configured to be
connected to the anchor point of the vehicle; and the third locking member is arranged close to the first end of the top tether, and the top tether, when tensioned, presses against the pressing portion to cause the third locking member to rotate from the lock position to the unlock position.

17. The child safety seat according to claim 16, wherein the third locking apparatus further includes a connecting rod arranged parallel to the first pivot shaft, the connecting rod forms the fixed point, and the first end of the top tether is provided with a first ring sleeving the connecting rod.

18. The child safety seat according to claim 15, wherein a first end of the top tether is connected to the pressing portion, and a second end of the top tether is configured to be connected to the anchor point of the vehicle.

19. The child safety seat according to claim 18, wherein the pressing portion is provided with a second mounting hole, and the first end of the top tether is provided with a second ring passing through the second mounting hole.

20. The child safety seat according to claim 15, wherein the first locking member further includes a bracket, the bracket includes a bottom plate, and a first side plate and a second side plate which are opposite to each other, two ends of the first pivot shaft are connected to the first side plate and the second side plate, respectively, and the third elastic member is a torsion spring sleeving the first pivot shaft, and when the third locking member is located at the lock position, the adjustment belt is clamped between the abutting portion and the bottom plate.

\* \* \* \* \*